United States Patent [19]

Simroth

[11] 4,104,236
[45] Aug. 1, 1978

[54] LIQUID POLYMER/POLYOLS AND POLYURETHANE ELASTOMERS BASED THEREON

[75] Inventor: Donald W. Simroth, Charleston, W. Va.

[73] Assignee: Union Carbide Corporation, New York, N.Y.

[21] Appl. No.: 593,164

[22] Filed: Jul. 3, 1975

Related U.S. Application Data

[63] Continuation-in-part of Ser. No. 501,362, filed Aug. 28, 1974, abandoned.

[51] Int. Cl.² .......................... C08K 5/06; C09K 3/00; C08G 18/14; C08G 18/62
[52] U.S. Cl. .............................. 260/33.2 R; 252/182; 521/137; 260/859 R; 528/47
[58] Field of Search .................... 260/2.5 AP, 33.2 R, 260/77.5 CR; 252/182

[56] References Cited

U.S. PATENT DOCUMENTS

| | | | |
|---|---|---|---|
| 1,992,325 | 2/1935 | Schaarwaechter | 148/11.5 |
| 2,230,236 | 2/1941 | Dean | 75/134 |
| 2,234,552 | 3/1941 | Dean et al. | 148/32 |
| 2,280,818 | 4/1942 | Frey et al. | 260/94 |
| 2,294,389 | 9/1942 | Dean et al. | 201/76 |
| 2,407,543 | 9/1946 | Faust | 204/104 |
| 3,128,701 | 4/1964 | Rinehart et al. | 102/20 |
| 3,652,639 | 3/1972 | Pizzini et al. | 260/75 NN |
| 3,823,201 | 7/1974 | Pizzini et al. | 260/33.4 R |
| 3,953,393 | 4/1976 | Ramlow et al. | 260/33.2 R |

FOREIGN PATENT DOCUMENTS

| | | | |
|---|---|---|---|
| 788,115 | 2/1973 | Belgium | 260/33.4 R |
| 818,680 | 2/1975 | Belgium. | |
| 785,835 | 5/1968 | Canada. | |
| 1,239,701 | 7/1971 | United Kingdom. | |
| 1,321,679 | 6/1973 | United Kingdom. | |

*Primary Examiner*—H.S. Cockeram
*Attorney, Agent, or Firm*—Eugene C. Trautlein

[57] ABSTRACT

This invention relates to novel liquid polymer/polyol compositions consisting essentially of: (1) from 45 to 90 wt.% of a polyoxypropylene polyol having a molecular weight of at least 1500 and (2) from 55 to 10 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free of polymer particles have diameters over 30 microns and said composition having been produced by polymerizing a monomer mixture of acrylonitrile and styrene in the polyol. The novel polymer/polyols are convertible to novel polyurethane foams having high load-bearing properties and to solid polyurethane elastomers having a high modulus.

10 Claims, 11 Drawing Figures

EXCLUSION CURVE BETWEEN PRODUCTS WHICH COMPLETELY PASS THROUGH A 700 MESH SCREEN AND PRODUCTS WHICH DO NOT PASS FOR 5000 MOLECULAR WEIGHT POLYOLS

A/S RATIO OF MONOMER IN FEED

VISCOSITY VS. A/S RATIO POLYOL II

LIQUID POLYMER/POLYOLS AND POLYURETHANE ELASTOMERS BASED THEREON

CROSS REFERENCE TO RELATED APPLICATION

This application is a continuation-in-part of U.S. Pat. Application Ser. No. 501,362, filed Aug. 28, 1974 now abandoned.

BACKGROUND OF THE INVENTION

Polymer/polyol compositions suitable for use in producing polyurethane foams are known materials. Such compositions can be produced by polymerizing one or more olefinically unsaturated monomers dissolved or dispersed in a polyol in the presence of a free radical catalyst. These polymer/polyol compositions have the valuable properties of imparting to polyurethane foams produced therefrom higher load-bearing properties than are imparted by unmodified polyols and of imparting higher modulus to solid polyurethane elastomers made therefrom than are imparted by unmodified polyols.

The polymer/polyol compositions that have found commercial acceptance prior to the present invention are primarily compositions produced from polyols and acrylonitrile or acrylonitrile-styrene mixtures. Such compositions usually contain about 80 wt.% polyol and about 20 wt.% polymer. The polymer is an acrylonitrile homopolymer or copolymers of approximately 40 to 55 wt.% acrylonitrile and 60 to 45 wt.% styrene. Some of the polymer is grafted to the polyol to form a graft copolymer which stabilizes the remaining polymer particles so they remain dispersed in the polyol. The higher load-bearing properties and higher modulus of polyurethanes produced from such polymer/polyol compositions is attributed to the polymer in the compositions.

Attempts to produce, on a commercial scale, polymer/polyol compositions that have much more than 20 wt.% polymer and that, consequently, impart even higher load-bearing properties and modulus to polyurethanes involve various difficulties. Thus, when the polymer in the composition is made from acrylonitrile alone and the polymer content is much above 20 wt.%, the compositions usually have undesirably high viscosities and large granules usually form. Such granules create difficulties in the preparation, handling and utilization of the compositions (e.g., the granules can clog the reactors in which the compositions are made and the filters in the feed lines in the relatively sophisticated machines in which polyurethane foams are now produced from the compositions). Similarly, when the polymer in the composition is made from acrylonitrile and styrene in the relative amounts indicated above and the polymer content is much above 20 wt.%, excessive amounts of large granules are usually formed.

The difficulties in producing polymer polyol compositions wherein the polymer is made from acrylonitrile and styrene are particularly severe in the process of the runs of Example 6 of Canadian Patent 785,835 wherein such monomers were employed. The latter process entails the production of very unsatisfactory compositions due to granule formation. A considerable improvement in the particulate nature of such polymer polyol compositions is achieved when the process described in Belgian Patent 788,115 is employed. However, even the process of the latter patent leaves room for further improvement in terms of granule formation at polymer contents much above 20 wt.-%.

Prior commercial polymer/polyol compositions have been made from polyols having molecular weights of about 3000 and higher. The use of lower molecular weight polyols provides polymer/polyol compositions convertible to polyurethanes having properties that can be conveniently achieved only by having low molecular weight polyol moieties in the polyurethane structure. However, the use of lower molecular weight polyols has not proven completely satisfactory because the resulting polymer/polyol compositions are not as stable to phase separation as is desirable by present industrial standards, especially at polymer contents of 15 wt.% and higher.

The viscosity of a polymer/polyol composition is an important property with respect to the ease of handling (e.g., pumping) of the composition and with respect to the ability of polyurethane-forming mixtures containing the composition to fill molds. It is desirable to minimize viscosity at a given polymer content in order to optimize the ease of handling the composition at a given level of polyurethane load-bearing and modulus enhancement (i.e., at a given polymer content) and in order to facilitate molding such polyurethane-forming mixtures.

In addition to the above-described commercially available polymer/polyol compositions, a wide variety of other polymer/polyol compositions are known in the art. Such compositions are disclosed, for example, in U.S. Pat. Nos. 3,304,273; 3,383,351 and 3,823,201; Canadian Pat. No. 735,010 and German Pat. Nos. 1,152,536 and 1,152,537.

It is an object of this invention to provide improved polymer/polyol compositions.

It is a further object of this invention to provide readily processable polymer/polyol compositions that contain over 20 wt.% of an acrylonitrile-styrene polymer and that can be used to produce polyurethane foams having relatively high load-bearing properties and solid polyurethanes having relatively high modulus.

It is an additional object of this invention to provide stable polymer/polyol compositions that contain relatively low molecular weight polyols.

It is another object of this invention to provide polymer/polyol compositions that have relatively low viscosities at given polymer contents and polyol molecular weights.

Other objects of this invention will be apparent from the description thereof appearing below.

SUMMARY OF THE INVENTION

This invention relates to novel liquid polymer/polyol composition consisting essentially of: (1) from 45 to less than 80 wt.% of a polyoxypropylene polyol having a molecular weight of at least 2,200 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free of polymer particles have diameters over 30 microns, said composition having been produced by polymerizing a monomer mixture of acrylonitrile and styrene in the polyol, said composition have (i) a wt.% of the monomer mixture, based on the sum of the weights of the monomer mixture and the polyol used to produce the composition, and (ii) a weight ratio of acrylonitrile to styrene in the monomer mixture such that a plot (i) versus (ii) falls in area A of FIG. 4 when the polyol has a molecular weight of about 5,000, in area B of FIG. 8 when the polyol has a molecular weight of about 3,000 or in area C of FIG. 9 when the polyol has a molecular weight of about 2,000. The novel polymer/polyols are convertible to novel polyurethane foams having high load-bearing properties and to solid polyurethane elastomers having high moduli. This invention does not include two specific polymer/polyol compositions within the scope of the above definition thereof that are incidentally disclosed, along with many other polymer/polyol compositions, in the prior art and does not include polyurethanes produced from those two compositions. The two excluded compositions are: (A) the composition of Example 1 of British Pat. Specification No. 1,321,679 which was produced from 60 wt.% of a polyol having a molecular weight of about 4,000 produced by the addition of 87 parts by weight of propylene oxide and 13 parts by weight of ethylene oxide to propylene glycol and 40 wt.% of a mixture of 80 wt.% acrylonitrile and 20 wt.% styrene; and (B) the composition of Example 4 of British Pat. Specification No. 1,321,679 which was produced from 70 wt.% of a polyol having a molecular weight of about 4,000 produced by the addition of 87 parts by weight of propylene oxide and 13 parts by weight of ethylene oxide to propylene glycol and 20 wt.% of a mixture of 80 wt.% of acrylonitrile and 20 wt.% styrene. In general, the polymer/polyol compositions of the present invention have lower viscosities than polymer/polyol compositions having the same polymer content and polyol starting material and having either lower or high acrylonitrile to styrene ratios. The viscosities of the novel compositions usually range from 500 to 15,000 centipoises at 25° C.

DESCRIPTION OF PREFERRED EMBODIMENTS

Figure 1:
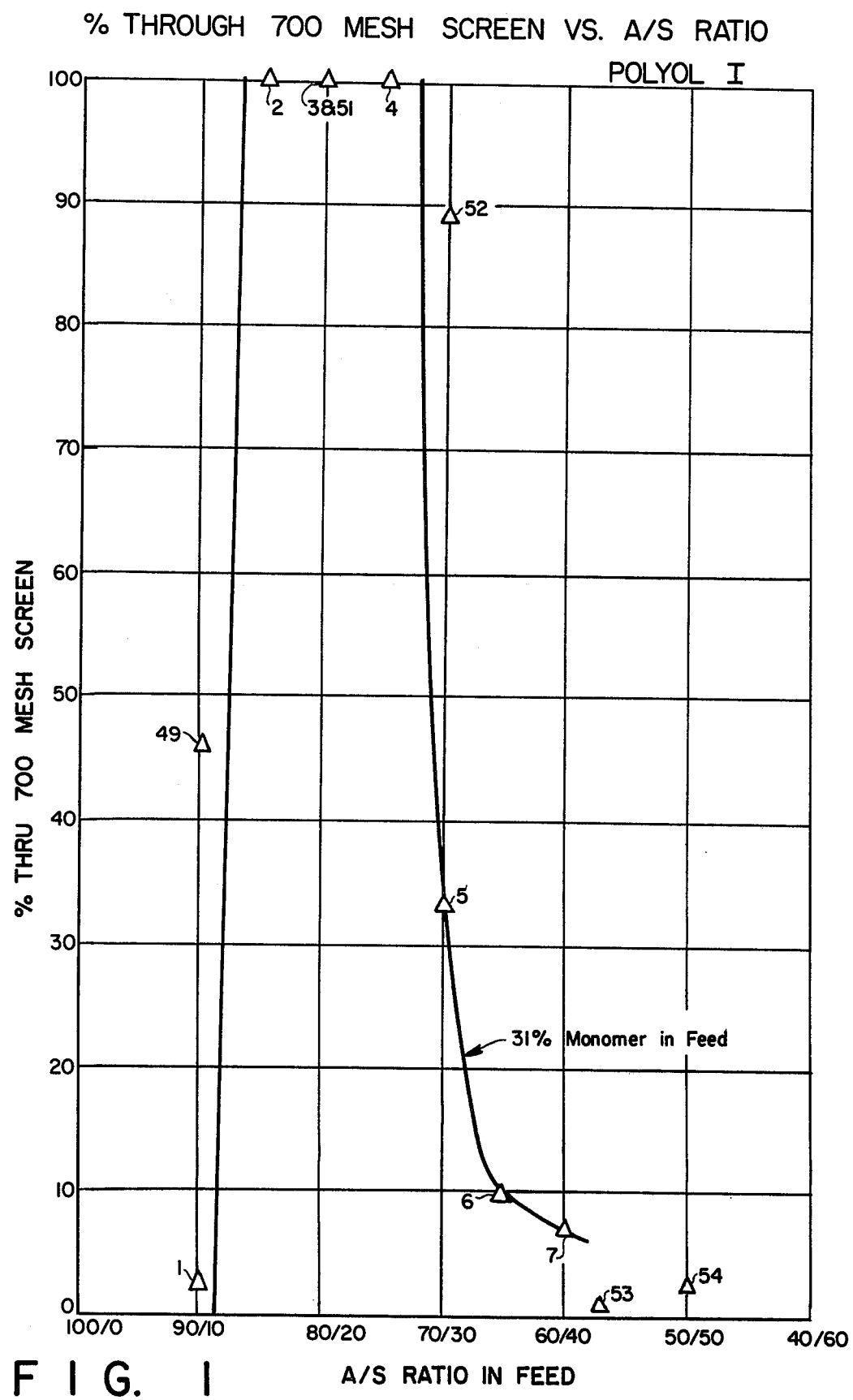
FIG. 1 is a plot of the wt-% of polymer/polyol compositions that pass through a 700 mesh screen vs. the acrylonitrile to styrene weight ratio in the acrylonitrile-styrene mixtures used to produce the compositions when the polyol ("Polyol I" described below) has a molecular weight of 5000.

The polymer/polyol compositions of this invention preferably consist essentially of from 45 to 75 wt. % of the polyol and from 55 to 25 wt. % of the polymer.

In order to provide compositions of the present invention having the particle size indicated above, due regard must be given the interrelationship of the compositional variables involved. Thus, the breadth of the usable polymer content (which corresponds approximately to the wt-% monomer mixture used) depends on the molecular weight and chemical composition of the polyol and on the weight ratio of acrylonitrile to styrene in the monomer mixture (which corresponds approximately to the ratio of polymerized acrylonitrile to polymerized styrene). Greater latitude in terms of polymer content is achieved with higher molecular weight polyols and with polyols containing some ethylene oxide, whether internally or at the end of the polyol molecule as capping groups. Ethylene oxide capping groups are preferred over internal ethylene oxide groups, particularly in the case of lower molecular weight polyols. Further, the breadth of the usable acrylonitrile to styrene ratio range for a polyol of a given molecular weight depends on the level of the polymer content. Generally, the higher the polymer content, the narrower the usable acrylonitrile to styrene range. The functionality of the polyol does not appear to be an important variable with regard to polymer particle size. By way of illustration, the following interrelationships apply to polyols having molecular weights of 5000, 3000 and 2000, respectively.

A. For a glycerol-started triol consisting of 86 wt.—% oxypropylene groups and 14 wt.—% oxyethylene groups and having a molecular weight of about 5000, the usable acrylonitrile to styrene weight ratio may vary between about 90:10 and 60:40 when the polymer content is no higher than about 25 wt.% with a preferred monomer range of 85:15 to 70:30. From 25 to 30 wt.% polymer, the usable acrylonitrile to styrene range with such a triol is between 90:10 and 70:30 with a preferred range of 85:15 to 75:25. At an acrylonitrile to styrene weight ratio of 80:20, a polymer/polyol can be made as high as 45 percent polymer or above with this triol.

B. For a glycerol-started triol consisting of oxypropylene groups and having a molecular weight of about 3000, the acrylonitrile to styrene weight ratio may vary between about 90:10 and 60:40 for polymer contents of up to about 20 wt.% with a preferred range of 85:15 to 70:30. At an acrylonitrile to styrene weight ratio of 80:20, an acceptable product can be made as high as 25 to 30 wt.% polymer using dipropylene glycol-started diol consisting of oxypropylene groups and having a molecular weight of about 3000.

C. For a dipropylene glycol-started diol consisting of oxypropylene groups and having a molecular weight of about 2000, the acrylonitrile to styrene weight ratio may vary between about 90:10 and 70:30 for a polymer content of up to about 20 percent with a preferred range of 85:15 to 75:25. At an acrylonitrile to styrene ratio of 80:20, a polymer/polyol can be made as high as about 25 wt.% polymer when using such a diol.

In the above illustrations and elsewhere herein unless indicated otherwise, the polyol molecular weights are number average molecular weights calculated using equation (A) below based on the functionality of the starter used to produce the polyol and the experimentally determined hydroxyl number of the polyol.

The polyols employed in this invention include both propylene oxide homopolymers and copolymers containing at least 55 wt% polymerized propylene oxide and up to 45 wt% of another polymerized alkylene oxide (e.g., ethylene oxide or butylene oxide). Preferably, the polyol contains from 80 to 99 wt% polymerized propylene oxide and from 20 to 1 wt% polymerized ethylene oxide. The polyols also contain residues of a starter such as ethylene glycol, dipropylene glycol, 1,3-dihydroxypropane, 1,3-dihydroxybutane, 1,4-dihydroxybutane, 1,10-dihydroxydecane, glycerol, 1,2,4-trihydroxybutane, 1,1,1-trimethylolpropane, hexanetriol and the like. The polyols have molecular weights of at least 1500. Preferably, the polyol molecular weights is at least 2000 (e.g., from 2000 to 6000). With regard to the particle size of the polymer in a polymer/polyol composition made from a polyol, the molecular weight of the polyol is the more important parameter compared to the equivalent weight (e.g., there is no difference between a diol and triol if the molecular weights are equal).

The polyols employed in producing the polymer/polyol compositions of this invention can have hydroxyl numbers which vary over a wide range. In general, the hydroxyl numbers of the polyols employed in the invention can range from about 20, and lower, to about 150, and higher. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{m.w.} \quad (A)$$

where
OH = hydroxyl number of the polyol
f = functionality of the polyol; that is, the average number of hydroxyl groups per molecule of polyol
m.w. = number average molecular weight of the polyol The polyol employed in producing a particular composition of this invention depends upon the end-use of the polyurethane product to be produced in that the hydroxyl number is selected to result in flexible or semi-flexible foams or elastomers when the polymer/polyol produced from the polyol is converted to a polyurethane. The polyols preferably possess a hydroxyl number of from about 50 to about 150 for semi-flexible foams and from about 20 to about 70 for flexible foams. Mixtures of polyols can be used.

The process used in producing the polymer/polyol compositions of this invention involves polymerizing the monomers in the polyol while maintaining a low monomer to polyol ratio throughout the reaction mixture during the polymerization. Such low ratios are achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. The temperature employed is any temperature at which the half life of the catalyst is no longer than six minutes. The mixing conditions employed are those attained using a back-mixed reactor (e.g., a stirred flask or stirred autoclave.) Such reactors keep the reaction mixture relatively homogeneous and so prevent localized high monomer to polyol ratios such as occur in certain tubular reactors (e.g., in the first stages of "Marco" reactors when such reactors are operated conventionally with all the monomer added to the first stage). However, tubular reactors (e.g., Marco reactors) can be employed if modified so that increments of the monomer are added to various stages.

When using a semi-batch process, the feed times can be varied (as well as the proportion of polyol in the reactor as the start versus polyol fed with the monomer) to effect changes in the product viscosity. Generally, longer feed times result in high product viscosities and may allow use of slightly broader acrylonitrile to styrene ranges for a given polyol and polymer content. Residence times are not narrowly critical, especially in continuous operation.

The crude polymer polyol compositions usually contain small amounts of unreacted monomers. Such residual monomers can be converted to additional polymer by employing a two-stage operation.

The temperature used in producing polymer/polyol compositions in accordance with this invention is any temperature at which the half life of the catalyst is no longer than 6 minutes (preferably no longer than from 1.5 to 2 minutes). The half lives of the catalysts become shorter as the temperature is raised. The maximum temperature used is not narrowly critical but should be lower than the temperature at which significant decomposition of the reactants or product occurs. By way of illustrations, azobisisobutyronitrile has a half life of six minutes at 100° C, In the process used to produce the polymer/polyols of this invention, the monomers are polymerized in the polyol. Usually, the monomers are soluble in the polyol. It has been found that first dissolving the monomers in a minor portion of the polyol and adding the solution so formed to the remainder of the polyol at reaction temperature facilitates mixing the monomers and the polyol and can reduce or eliminate reactor fouling. When the monomers are not soluble in the polyols, known techniques (e.g., dissolution of the insoluble monomers in another solvent) can be used to disperse the monomers in the polyol prior to polymerization. The conversion of the monomers to polymers achieved by this process is remarkably high, (e.g., conversions of generally 85% to 95% of the monomers are generally achieved).

The ratio of acrylonitrile to styrene in the polymer is always slightly lower than the ratio of acrylonitrile to styrene monomer in the feed because the styrene tends to react slightly faster than the acrylonitrile. For example, if acrylonitrile and styrene monomers were fed at a weight ratio of 80:20, the resulting polymer would have an acrylonitrile to styrene weight ratio of about 79:21 or 78:22.

While the present invention is directed to the use of an acrylonitrile-styrene monomer system, it should be appreciated that minor amounts of an additional monomer or monomers may be employed. However, in such event, the relative amount of acrylonitrile should remain within the limits set forth herein.

The polymer/polyol compositions of this invention are novel compositions of matter characterized by the relatively high concentration of small particles of the polymer therein such that essentially all of the polymer particles are less than about 30 microns as shown by their ability to pass essentially completely (i.e., over 99-wt.-%) through, successively, a 150-mesh wire screen with average mesh openings of about 105 microns and a 700-mesh wire screen with average mesh openings of about 30 microns when diluted with isopropanol (470 grams composition and 940 grams isopropanol) to reduce the viscosity. Usually the number average polymer particle size is less than about one micron.

The polymers in the polymer polyol compositions of this invention are present as discrete polymer particles and relatively small agglomerates resulting from the coalescing of two or more discrete particles and agglomerates in the polymer polyols. The term "particle size" as used herein refers to the number average size of such discrete particles and agglomerates. The polymer polyols are free of large polymer particles (large granules produced by the coalescing of many discrete particles) in an amount that would impair the preparation, handling and utilization of the polymer polyols.

The polymer/polyol compositions of this invention are stable dispersions such that essentially all of the polymer particles remain dispersed on standing over extended periods of time of several months without showing any significant settling. This product stability is also confirmed by the relatively small amount of material (cake) which is thrown down from samples placed in laboratory centrifuges. However, the amount of cake formed is a function of the molecular weight of the polyol. The cake which is evident when the tube is inverted and free polyol allowed to drain off is not all polymer but also contains trapped polyol.

The invention also provides novel elastomeric polyurethanes produced by reacting: (a) a polymer/polyol composition of this invention and (b) an organic polyisocyanate in the presence of (c) a catalyst for the reaction of (a) and (b) to produce the polyurethane. The reaction can be performed in any suitable manner such as by the prepolymer or one-shot technique. When the polyurethane is a foam, the reaction mixture also contains a blowing agent and usually contains a foam stabilizer. When the polyurethane is a solid or microcellular elastomer, the reaction mixture can also contain chain extenders.

The organic polyisocyanates that are useful in producing polyurethanes in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate; 3,3'-diphenylmethylene diisocyanate; and polymethylene poly(phenyleneisocyanates) having the formula:

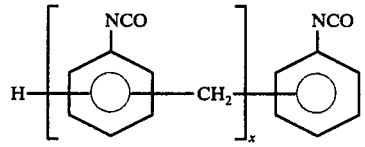

wherein $x$ has an average value from 1.1 to 5 inclusive (preferably from 2.0 to 3.0).

The catalysts that are useful in producing polyurethane in accordance with this invention include: tertiary amines such as bis(dimethylamino ethyl) ether, trimethylamine, triethylamine, N-methylmorpholine, N-ethylmorpholine, N,N-dimethylethanolamine, N,N,N',N'-tetramethyl-1,3-butanediamine, triethanolamine, 1,4-diazabicyclo[2.2.2]octane, pyridine oxide and the like, and organotin compounds such as dialkyltin salts of carboxylic acids, e.g. dibutyltin diacetate, dibutyltin dilaurate, dibutyltin maleate, dilauryltin diacetate, dioctyltin diacetate, and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin dichloride, and the like. The catalysts are employed in small amounts, for example, from about 0.001 percent to about 5 percent based on weight of the reaction mixture.

The blowing agents useful in producing polyurethane foams in accordance with this invention include water and halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

The foam stabilizers useful in producing polyurethane foams in accordance with this invention include "hydrolyzable" polysiloxane-polyoxyalkylene block copolymer such as the block copolymers described in U.S. Pat. Nos. 2,834,748 and 2,917,480. Another useful class of foam stabilizers are the "non-hydrolyzable" polysiloxanepolyoxyalkylene block copolymers such as the block copolymers described in U.S. Pat. No. 3,505,377; U.S. Pat. application Ser. No. 888,067, filed Dec. 24, 1969 and British Pat. Specification No. 1,220,471.

The extenders useful in producing microcellular polyurethane elastomers in accordance with this invention include aromatic polyamines and aromatic glycols. Illustrative of suitable hindered aromatic polyamines are 3-chloro-4,4'-diaminodiphenylmethane, 4,4'-methylene bis(2-chloroaniline), cumene diamine, toluene diamine, and dichlorobenzidine. Illustrative of the aromatic glycols are reaction products of alkylene oxides with aromatic amines or alcohols having two active hydrogens, especially reaction products of alkylene oxides with di[hydroxyalkoxy] aryl compounds and primary amino aryl compounds. The preferred aromatic glycols are the reaction products of ethylene oxide and aniline. Other extenders that may be used include ethylene oxide and propylene oxide adducts of bisphenol A ("PLURACOL-P-245") or the propylene oxide adducts of aniline ("C-100"). Still other useful extenders are butane diol, ethylene glycol, diethylene glycol, propylene glycol, dipropylene glycol, etc.

Polyurethanes produced in accordance with this invention are useful in the applications in which polyurethanes made from conventional polymer/polyol compositions are employed and are particularly useful as arm rests, crash pads, mattresses, and automobile bumpers.

The following Examples illustrate the present invention:

DEFINITIONS

As used in the Examples appearing below, the following designations, symbols, terms and abbreviations have the indicated meanings.

"Theoretical molecular weight" of a polyol denotes a molecular weight calculated using equation (A) above based on the functionality of the starter used to produce the polyol and the experimentally determined hydroxyl number of the polyol.

"Experimentally determined molecular weight" of a polyol denotes a molecular weight calculated using equation (A) above based on the experimentally determined functionality and hydroxyl number of the polyol.

"Molecular weights" of polyols are number average molecular weights: either theoretical or experimental.

"Triol" or "Diol" denotes the nominal functionality of a polyol based on the functionality of the starter. Actual polyol functionalities are somewhat lower (3 to 20% lower) than with nominal functionality because of the presence of some amount of lower functionality material produced by side reactions. These side reactions are more significant the higher the molecular weight of the polyol being produced.

"Polyol I": A polyalkylene oxide triol produced from propylene and ethylene oxides and glycerine and having theoretical number average molecular weight of 5000 and an experimentally determined number average molecular weight of about 4300. The alkylene oxide units are present primarily in blocks and the primary OH content is about 75%. The ethylene oxide is used to "cap" the triol. Based on its alkylene oxide content, this triol contains 85 wt-% $C_3H_6O$ and 15 wt-% $C_2H_4O$.

"Polyol II": A polypropylene oxide triol produced from propylene oxide and glycerine and having a theoretical number average molecular weight of about 3,000.

"Polyol III": A polypropylene oxide triol produced from propylene oxide and glycerine and having a theoretical number average molecular weight of about 5000 and an analytically determined number average of about 4200.

"Polyol IV": A polypropylene oxide triol produced from propylene oxide and glycerine and having a theoretical number average molecular weight of about 6000.

"Polyol V": A polypropylene oxide diol produced from propylene oxide and dipropylene glycol and having a theoretical number average molecular weight of about 1000.

"Polyol VI": A polypropylene oxide diol produced from propylene oxide and dipropylene glycol and having a theoretical number average molecular weight of about 2000.

"Polyol VII": A polypropylene oxide diol produced from propylene oxide and dipropylene glycol and having a theoretical number average molecular weight of about 3000.

"Polyol VIII": A polypropylene oxide triol produced from propylene oxide and glycerine and having a hydroxyl number of 650.

"A/S" or "A:S" denotes the weight ratio of acrylonitrile to styrene.

"Calc" denotes calculated.

"cps" denotes centipoises.

"gm" denotes grams.

"hr" denotes hour.

"Parts" denotes parts by weight.

"Poly A" denotes polyacrylonitrile.

"Poly S" denotes polystyrene.

"ppm" denotes parts by weight per million parts by weight.

"pli" denotes pounds per linear inch.

"TDI" a mixture of 80% 2,4-tolylene diisocyanate and 20% 2,6-tolylene diisocyanate.

"wt-%" denotes percent by weight.

"VAZO-64" or "VAZO" denotes 2,2'-azo-bisisobutyronitrile.

"%" denotes percentage by weight unless otherwise stated.

"*" denotes a comparative Example and not an Example of this invention.

FILTERABILITY

The compositions of this invention are essentially free of polymer particles having diameters over 30 microns. A composition meets this criteria if over 99 wt. % of the composition passes successively through a 150-mesh screen and a 700 mesh screen in the following test. A 470 gram sample of the composition being tested is diluted with 940 grams of isopropanol to reduce viscosity effects. The diluted sample is passed through a 2.4 square inch 150 mesh screen and then through a 2.4 square inch 700 mesh screen. (The screens are cleaned, dried and weighed before the test.) Then the screens are washed with isopropanol to remove any polyol, dried and weighed. The difference between the final and initial screen weights corresponds to the amount of polymer that did not pass through the screens. The 150-mesh screen has a square mesh with average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazzo, Michigan.

CENTRIFUGABLE SOLIDS

The polymer/polyol composition is centrifuged for about 24 hours at about 3000 revolutions per minute and 1470 radial centrifugal "g" force. Then the centrifuge tube is inverted and allowed to drain for four hours. The non-flowing cake remaining at the bottom of the tube is reported as wt. % of the initial weight of the composition tested.

EXAMPLES 1 to 47

Examples 1 to 46 were conducted continuously in a tank reactor fitted with baffles and an impeller. The feed components were pumped to the bottom of the reactor continuously after going through an inline mixer to assure complete mixing of the feed components before entering the reactor. The internal temperature of the reactor was controlled to within one degree Centigrade by controlled heating or cooling to the outside of the reactor. The contents of the reactor were well stirred. The product from the top of the reactor flowed out the top of the reactor continuously through a back pressure regulator. (The regulator was adjusted to give some positive back pressure in the reactor.) Then the product flowed through a water cooled tubular heat exchanger to a product receiver. Portions of the crude product were vacuum stripped at 2 millimeters pressure and 120° to 130° C for testing. Conversions were determined from analysis of the amount of unreacted monomers present in the crude product before stripping. In run 47 the product from the top of the reactor was heated further in a second stage reactor to increase the conversion of monomer to polymer.

The experimental conditions and results of Examples 1 to 47 are tabulated in Tables A to H below. Since 100% of the compositions produced in Examples 1 to 40 and 43 to 47 passed through the 150-mesh screen in the Filterability Test, only the % that passed through the 700-mesh screen are shown in Tables A to H.

TABLE A

| Example | 1(a)* | 2 | 3 | 4 | 5* | 6* | 7* |
|---|---|---|---|---|---|---|---|
| Reaction Temperature, ° C. | 120.5 | 120.5 | 120 | 120 | 120 | 120 | 120 |
| Wt. % "VAZO" In Feed | 0.39 | 0.39 | 0.40 | 0.40 | 0.39 | 0.40 | 0.41 |
| Monomer Content In Feed, Wt. % | 30.4 | 30.3 | 30.6 | 31.2 | 30.4 | 31.3 | 31.5 |
| Ratio of Acrylonitrile to Styrene | 90/10 | 85/15 | 80/20 | 75/25 | 70/30 | 65/35 | 60/40 |
| Polyol Feed Rate, gm/hr. | 1904 | 1898 | 1888 | 1880 | 1956 | 1900 | 1866 |
| Polyol | I | I | I | I | I | I | I |
| Monomer Feed Rate, gm/hr. | 832 | 824 | 832 | 852 | 856 | 864 | 858 |
| Polymer In Product | | | | | | | |
| By Calc. - Poly A, % | 23.1 | 23.8 | 22.8 | 21.8 | 19.8 | 18.8 | 17.3 |
| Poly S, % | 3.1 | 4.5 | 6.0 | 7.7 | 9.0 | 10.8 | 12.4 |
| Total, % | 26.2 | 28.3 | 28.8 | 29.5 | 28.8 | 29.6 | 29.7 |
| A/S Ratio | 88/12 | 84/16 | 79/21 | 74/26 | 69/31 | 63/37 | 58/42 |
| Product Properties | | | | | | | |
| Viscosity (Hoeppler) at 25° C. cps. | 8,968 | 2,965 | 2,828 | 3,365 | 3,143 | 3,424 | 3,728 |
| Filterability - % through 700-mesh | 2.8 | 100 | 100 | 100 | 33.4 | 9.8 | 7.0 |
| Centrifugable solids, % | 50.3 | 3.19 | 2.65 | 4.17 | 5.63 | 8.22 | 7.39 |

(a)Run completed, but reactor plugged with mush-like build-up.
*In this Table and in the following Tables, the asterisk denotes an Example not illustrating the invention presented only for purpose of comparison.

TABLE B

| Example | 8 | 9 | 10 | 11 | 12 | 13 |
|---|---|---|---|---|---|---|
| Reaction Temperature, ° C. | 120 | 120 | 130 | 130 | 130 | 129.9 |
| Wt. % "VAZO" in Feed | 0.41 | 0.40 | 0.41 | 0.40 | 0.40 | 0.40 |
| Monomer Content In Feed, Wt. % | 23.8 | 25.9 | 31.4 | 35.8 | 40.8 | 46.2 |
| Ratio of Acrylonitrile to Styrene | 80/20 | → | → | → | → | → |
| Polyol Feed Rate, gm/hr. | 2020 | 2043 | 946 | 894 | 812 | 744 |
| Polyol | I | I | I | I | I | I |
| Monomer Feed Rate, gm/hr. | 631 | 712 | 434 | 498 | 560 | 640 |
| Polymer In Product | | | | | | |
| By Calc. - Poly A, % | 17.1 | 18.9 | 23.6 | 27.4 | 31.4 | 35.6 |
| Poly S, % | 4.6 | 5.0 | 6.2 | 7.1 | 8.1 | 9.3 |
| Total, % | 21.7 | 23.9 | 29.8 | 34.5 | 39.5 | 44.9 |
| A/S Ratio | 79/21 | 79/21 | 79/21 | 79/21 | 79/21 | 79/21 |
| Product Properties | | | | | | |
| Viscosity (Hoeppler) at 25° C, cps. | 2,008 | 2,105 | 3,150 | 4,240 | 6,434 | 12,282 |
| Filterability - % through 700-mesh | 100 | 100 | 100 | 100 | 100 | 100 |
| Centrifugable solids, % | 2.0 | 1.9 | 2.4 | 3.1 | 4.2 | 4.8 |

TABLE C

| Example | 14* | 15* | 16 | 17(a)* | 18 |
|---|---|---|---|---|---|
| Reaction Temperature, °C. | 120 | 120.5 | 120.5 | 120.5 | 120 |
| Wt. % "VAZO" in Feed | 0.40 | 0.41 | 0.40 | 0.40 | 0.39 |
| Monomer Content In Feed, Wt. % | 22.2 | 27.5 | 27.3 | 26.9 | 21.8 |
| Ratio of Acrylonitrile to Styrene | 50/50 | 50/50 | 80/20 | 90/10 | 90/10 |
| Polyol Feed Rate, gm/hr. | 2180 | 2000 | 1988 | 2052 | 2212 |
| Polyol | III | III | III | III | III |
| Monomer Feed Rate, gm/hr. | 624 | 754 | 752 | 756 | 618 |
| Polymer In Product | | | | | |
| By Calc. - Poly A, % | 9.9 | 12.4 | 20.5 | 21.6 | 17.5 |
| Poly S, % | 10.5 | 13.2 | 5.4 | 2.7 | 2.1 |
| Total, % | 20.4 | 25.6 | 25.9 | 24.3 | 19.6 |
| A/S Ratio | 48/52 | 48/52 | 79/21 | 89/11 | 89/11 |
| Product Properties | | | | | |
| Viscosity (Hoeppler) at 25° C, cps | 2,053 | 2,809 | 2,498 | 7,212 | 4,032 |
| Filterability - % through 700-mesh | 100 | 0.6 | 100 | 11.5 | 100 |
| Centrifugable solids, % | 7.3 | 12.4 | 2.58 | 66.8 | 49.7 |

(a) Poor operation; reactor tending to plug.

TABLE D

| Example | 19* | 20 | 21 | 22* | 23* |
|---|---|---|---|---|---|
| Reaction Temperature, °C. | 120 | 120 | 120 | 120 | 120 |
| Wt. % "VAZO" in Feed | 0.41 | 0.41 | 0.42 | 0.40 | 0.42 |
| Monomer Content In Feed, Wt. % | 21.5 | 21.5 | 21.9 | 21.1 | 21.9 |
| Ratio of Acrylonitrile to Styrene | 90/10 | 80/20 | 70/30 | 60/40 | 50/50 |
| Polyol Feed Rate, gm/hr. | 2160 | 2128 | 2050 | 2068 | 2092 |
| Polyol | II | II | II | II | II |
| Monomer Feed Rate, gm/hr. | 592 | 589 | 578 | 554 | 588 |
| Polymer In Product | | | | | |
| By Calc. - Poly A, % | 16.6 | 15.4 | 13.6 | 11.1 | 9.5 |
| Poly S, % | 2.1 | 4.2 | 6.3 | 8.0 | 10.3 |
| Total, % | 18.7 | 19.6 | 19.9 | 19.1 | 19.8 |
| A/S Ratio | 89/11 | 79/21 | 68/32 | 58/42 | 48/52 |
| Product Properties | | | | | |
| Viscosity (Hoeppler) at 25° C, cps. | 2,616 | 1,082 | 1,200 | 1,238 | 1,549 |
| Filterability - % through 700-mesh | 67 | 100 | 100 | 6 | 0.6 |
| Centrifugable solids, % | 57.7 | 4.4 | 8.6 | 10.4 | 22.3 |

TABLE E

| Example | 24 | 25* | 26* | 27* |
|---|---|---|---|---|
| Reaction Temperature, °C. | 120 | 120 | 120 | 120 |
| Wt. % "VAZO" in Feed | 0.41 | 0.40 | 0.41 | 0.44 |
| Monomer Content In Feed, Wt. % | 18.3 | 18.1 | 13.4 | 8.7 |
| Ratio of Acrylonitrile to Styrene | 90/10 | 50/50 | 50/50 | 50/50 |
| Polyol Feed Rate, gm/hr. | 2244 | 2264 | 2352 | 2366 |
| Polyol | II | II | II | II |
| Monomer Feed Rate, gm/hr. | 503 | 500 | 363 | 226 |
| Polymer In Product | | | | |
| By Calc. - Poly A, % | 14.4 | 7.6 | 5.3 | 3.2 |
| Poly S, % | 1.7 | 8.2 | 5.8 | 3.8 |
| Total, % | 16.1 | 15.8 | 11.1 | 7.0 |
| A/S Ratio | 89/11 | 48/52 | 48/52 | 46/54 |
| Product Properties | | | | |
| Viscosity (Hoeppler) at 25° C, cps | 1,497 | 948 | 823 | 726 |
| Filterability - % through 700-mesh | 100 | 14 | 100 | 100 |
| Centrifugable solids, % | 40.9 | 12.7 | 6.2 | 1.5 |

TABLE F

| Example | 28 | 29* | 30* | 31* |
|---|---|---|---|---|
| Reaction Temperature, °C. | 120 | 120 | 130 | 120 |
| Wt. % "VAZO" in Feed | 0.40 | 0.40 | 0.41 | 0.41 |
| Monomer Content in Feed, Wt. % | 25.9/31.2 | 36.5 | 27.6 | |
| Ratio of Acrylonitrile to Styrene | 80/20 | 80/20 | 80/20 | 70/30 |
| Polyol Feed Rate, gm/hr. | 2004 | 1897 | 876 | 1980 |
| Polyol | VII | VII | VII | VII |
| Monomer Feed Rate, gm/hr. | 702 | 860 | 512 | 754 |
| Polymer In Product | | | | |
| By Calc. - Poly A, % | 18.7 | 23.0 | 28.1 | 17.3 |
| Poly S, % | 5.0 | 6.1 | 7.3 | 8.0 |
| Total, % | 23.7 | 29.1 | 35.4 | 25.3 |
| A/S Ratio | 79/21 | 79/21 | 79/21 | 68/32 |
| Product Properties | | | | |
| Viscosity (Hoeppler) at 25° C, cps. | 1,549 | 2,112 | 3,447 | 1,927 |
| Filterability - % through 700-mesh | 100 | 36 | 6.2 | 1.9 |
| Centrifugable solids, % | 3.7 | 10.1 | 13.3 | 14.3 |

TABLE G

| Example | 32 | 33 | 34* | 35 | 37(a)* | 37* | 38* | 49 | 40 |
|---|---|---|---|---|---|---|---|---|---|
| Reaction Temperature, °C | 120 | 120 | 120 | 120.5 | 120 | 120 | 120 | 120 | 120 |
| Wt. % "VAZO" in Feed | 0.40 | 0.39 | 0.41 | 0.40 | 0.39 | 0.40 | 0.43 | 0.41 | 0.44 |
| Monomer Content In Feed, Wt. % | 26.2 | 25.6 | 26.5 | 20.1 | 16.6 | 12.2 | 7.5 | 17.4 | 7.7 |

TABLE G-continued

| Example | 32 | 33 | 34* | 35 | 37(a)* | 37* | 38* | 49 | 40 |
|---|---|---|---|---|---|---|---|---|---|
| Ratio of Acrylonitrile to Styrene | 85/15 | 80/20 | 70/30 | 80/20 | 50/50 | 50/50 | 50/50 | 90/10 | 90/10 |
| Polyol Feed Rate, gm/hr. | 2060 | 2056 | 2014 | 2248 | 2232 | 2386 | 2576 | 2272 | 2550 |
| Polyol | VI | VI | VI | VI | VI | VI | VI | VI | VI |
| Monomer Feed Rate, gm/hr. | 732 | 708 | 726 | 564 | 444 | 332 | 208 | 478 | 214 |
| Polymer In Product | | | | | | | | | |
| By Calc. - Poly A, % | 20.0 | 18.6 | 16.8 | 14.0 | 6.7 | 4.5 | 2.3 | 13.0 | 5.1 |
| Poly S, % | 3.8 | 5.0 | 7.7 | 3.8 | 7.4 | 5.1 | 2.8 | 1.6 | .7 |
| Total, % | 23.8 | 23.6 | 24.5 | 17.8 | 14.1 | 9.6 | 5.1 | 14.6 | 5.8 |
| A/S Ratio | 84/16 | 79/21 | 69/31 | 79/21 | 48/2 | 47/53 | 45/55 | 89/11 | 88/12 |
| Product Properties | | | | | | | | | |
| Viscosity (Hoeppler) at 25° C, cps. | 926 | 853 | 1,156 | 637 | 1245 | 667 | 668 | 741 | 422 |
| Filterability - % through 700-mesh | 100 | 100 | 1 | 100 | 0.6 | 26.6 | 100 | 100 | 100 |
| Centrifugable solids, % | 13.4 | 9.8 | 25.6 | 6.9 | 58.2 | 42.4 | 44.6 | 29.6 | 0.9 |

(a)Reactor plugged - run not completed.

TABLE H

| Example | 41(a)* | 42(b)* | 43* | 44 | 45* | 46* | 47(c) |
|---|---|---|---|---|---|---|---|
| Reaction Temperature, ° C | 120 | 120 | 120 | 120 | 120 | 120 | 120 |
| Wt. % "VAZO" in Feed | 0.39 | 0.44 | 0.40 | 0.40 | 0.40 | 0.40 | 0.41 |
| Monomer Content In Feed, Wt. % | 25.5 | 7.7 | 26.8 | 27.3 | 27.1 | 22.5 | 31.3 |
| Ratio of Acrylonitrile to Styrene | 80/20 | 80/20 | 50/50 | 80/20 | 90/10 | 50/50 | 80/20 |
| Polyol Feed Rate, gm/hr. | 2064 | 2498 | 2092 | 2024 | 2046 | 2112 | 1904 |
| Polyol | V | V | IV | IV | IV | IV | I |
| Monomer Feed Rate, gm/hr. | 708 | 210 | 766 | 758 | 760 | 612 | 866 |
| Polymer In Product | | | | | | | |
| By Calc. - Poly A, % | | | 12.0 | 20.3 | 21.5 | 10.0 | 24.1 |
| Poly S, % | | | 12.9 | 5.3 | 2.7 | 10.7 | 6.2 |
| Total, % | | | 24.9 | 25.6 | 24.2 | 20.7 | 30.3 |
| A/S Ratio | | | 48/52 | 79/21 | 89/11 | 48/52 | 79/21 |
| Product Properties | | | | | | | |
| Viscosity (Hoeppler) at 25° C, cps. | | | 3461 | 3358 | 9680 | 2713 | 2868 |
| Filterability - % through 700-mesh | | | 2.9 | 100 | 3.4 | 100 | 100 |
| Centrifugable solids, % | | | 6.3 | 2.3 | 49.6 | 4.1 | 3.1 |

(a)Reactor plugged - run not completed.
(b)Product separated on standing.
(c)Two stages

EXAMPLES 48 to 54

The reactor used in these Examples was a tank equipped with an agitator and baffles. The reactor was pressurized in order to minimize the volatilization of the monomers and the reactor was accordingly equipped with a back-pressure valve. The reactor was operated in a continuous manner and the contents of the reactor were well stirred. The polyol used was Polyol I. Residual monomers in the product were determined and the residual monomers were stripped off under vacuum at 120°-130° C before the product was analyzed for viscosity, etc. Other reaction conditions were: 120° C, 0.5 wt-% catalyst, and 32 wt-% monomer in the feed. Observation about the individual Examples are as follows:

EXAMPLE 48

This Example was not completed because of high product viscosity and solids in the product which plugged off the effluent back pressure valve. Equilibrium conditions were not achieved. Only a small amount of product was collected before the run was terminated. A small amount of product was stripped and analyzed.

EXAMPLE 49

The flow of starting materials and product was stopped long enough to clean the back pressure valve after Example 48. Example 49 was started with a 90/10 A/S ratio. The reactor was not opened until after Example 50. The product under the conditions of Example 49 was quite seedy.

EXAMPLE 50

Without stopping the flow of starting materials and product, the monomer ratio was changed to 80/20. An obvious improvement was visible in the product. This improvement was even more striking considering the heavy buildup of polymer found when the reactor was opened after Example 50. The reactor was found half full of a polymer slush in the bottom which probably was produced during Example 48 and possibly Example 49. The reactor was cleaned after Example 50.

EXAMPLES 51 to 54

This series of Examples were conducted without any intervening shutdowns. Operation was good, without any problems of polymer buildup.

The experimental conditions and results of Examples 48 to 54 are tabulated in Tables I and J below:

TABLE I

| Example | 48* | 49* | 50* | 51 | 52* | 53* | 54* |
|---|---|---|---|---|---|---|---|
| Ratio of Acrylonitrile to Styrene | 100/0 | 90/10 | 80/20 | 80/20 | 70/30 | 57/43 | 50/50 |
| Reaction Temperature, ° C | | 121 | 120 | 120 | 120 | 120 | 120 |
| VAZO Conc., Wt. % in Feed | | 0.48 | 0.53 | 0.53 | 0.56 | 0.54 | 0.55 |
| Monomer Content in Feed, Wt. % | | 28.6 | 31.6 | 31.9 | 33.7 | 32.6 | 32.7 |
| Polyol I Feed Rate, gms/hr | | 2124 | 1812 | 1744 | 1772 | 1760 | 1748 |
| Monomer Feed Rate, gms/hr | | 849 | 836 | 816 | 900 | 852 | 848 |

*Comparative Example

TABLE J

| Example | 48* | 49* | 50* | 51 | 52* | 53* | 54* |
|---|---|---|---|---|---|---|---|
| Total Poly A in Product by Calc, % | — | 23.5 | 23.7 | 24.0 | 22.2 | 17.4 | 15.1 |
| Total Poly S in Product by Calc., % | — | 2.9 | 6.2 | 6.3 | 10.0 | 13.7 | 15.9 |
| Total Polymer in Product by Calc., % | — | 26.4 | 29.9 | 30.3 | 32.2 | 31.1 | 31.0 |
| A/S Ratio in Polymer | — | 89/11 | 79/21 | 79/21 | 69/31 | 56/44 | 49/51 |
| Total Poly A in Product by Anal., % | 27.0 | 22.2 | 23.4 | 22.7 | 20.5 | 18.5 | 15.6 |
| Total Poly S in Product by Anal., % | — | 2.9 | 6.3 | 6.5 | 8.8 | 13.0 | 14.3 |
| Total Polymer in Product by Anal., % | 27.0 | 25.1 | 29.7 | 29.2 | 29.3 | 31.5 | 29.9 |
| Product Properties | | | | | | | |
| Viscosity (Hoeppler) at 25° C, cps | 9650 | 8583 | 2920 | 3365 | 3758 | 4877 | 5070 |
| Light Transmissin, %[1] | | | | | | | |
| 500 mµ | 78 | 87.5 | 74.2 | 73.4 | 61.6 | 55.1 | 51.7 |
| 60 m∞ | 81.8 | 89.4 | 82.2 | 82.1 | 71.3 | 63.8 | 59.1 |
| Color Rating[2] | 6 | 3 | 1-1/2 | 1-1/2 | 1-1/2 | 1 | 1 |
| Sedimentaton Value, %[3] | 15.3 | 51.9 | 1.4 | 1.9 | 3.5 | 12.0 | 16.2 |
| Filterability[4] | | | | | | | |
| 150 Mesh - Time, min. | — | 11 sec. | 13 sec. | 10 sec. | 10 sec. | 10 min. | 10 min. |
| - % Thru | — | 100 | 100 | 100 | 100 | 32 | 10 |
| 700 Mesh - Time, min. | — | 20 | 10 | 2.8 | 20 | 11.6 | 10 |
| - % Thru | — | 46.6 | 41.7[5] | 100 | 89 | 0.9 | 2.8 |
| Appearance of Sample Bottle[6] | 2 | 3 | 2 | 1 | 2 | 4 | 4 |
| Sedimentation Rating[7] | 3 | 9 | 3 | 1 | 2 | 7 | 7 |

[1] 0.01 Percent polymer in Polyol II diluent.
[2] Lightest = 1, darkest = 6.
[3] By centrifuge test
[4] Sample diluted 2 to 1 with isopropanol.
[5] Low value believed result of carryover from Ex. 48 & 49
[6] Zeri is clear and 5 is whitish residue.
[7] Sediment in sample bottle. Zero is nothing and 8 is continuous white cake.

DETAILED DESCRIPTION OF THE DRAWINGS

The usable ranges of polymer contents (wt-% monomers) and acrylonitrile to styrene ratios of the compositions of the above Examples and other polymer/polyol compositions are shown for clarification in the attached figures for various molecular weight polyols. The numbers beside the data points in these figures refer to compositions produced in the correspondingly numbered Examples and each symbol "X" denotes a polymer/polyol composition that does not correspond to any of the numbered Examples.

In the Figures, the composition produced as described in Example III-D of U.S. Pat. No. 3,832,201 is designated "III-D", the composition produced as described in Example VII of U.S. Pat. No. 3,823,201 is designated "VII," the composition produced as described in Example 4-V of Belgian Pat. No. 788,155 is designated "4-V", the composition produced as described in Example 1 of British Pat. Specification No. 1,321,679 is designated "BPS-1" and the composition produced as described in Example 4 of British Pat. Specification No. 1,321,679 is designated "BPS-4".

Figure 8:
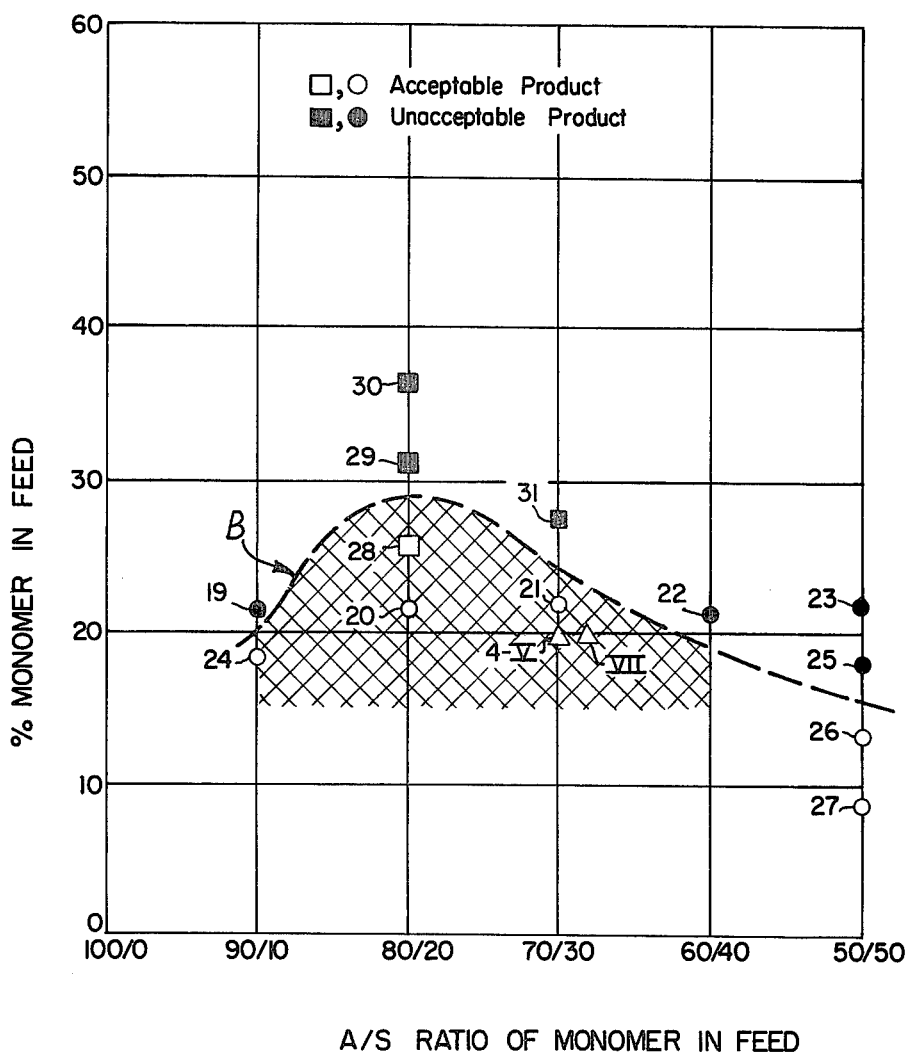
FIG. 8 is a plot of the wt-% of acrylonitrile-styrene mixtures used to produce polymer/polyol compositions vs. the acrylonitrile to styrene weight ratio in the mixtures when the polyols ("Polyol II" and "Polyol VII" described below) have molecular weights of 3000. The wt-% of the mixtures is based on the sum of the weights of the mixtures and the polyols used to produce the compositions.
Figure 9:
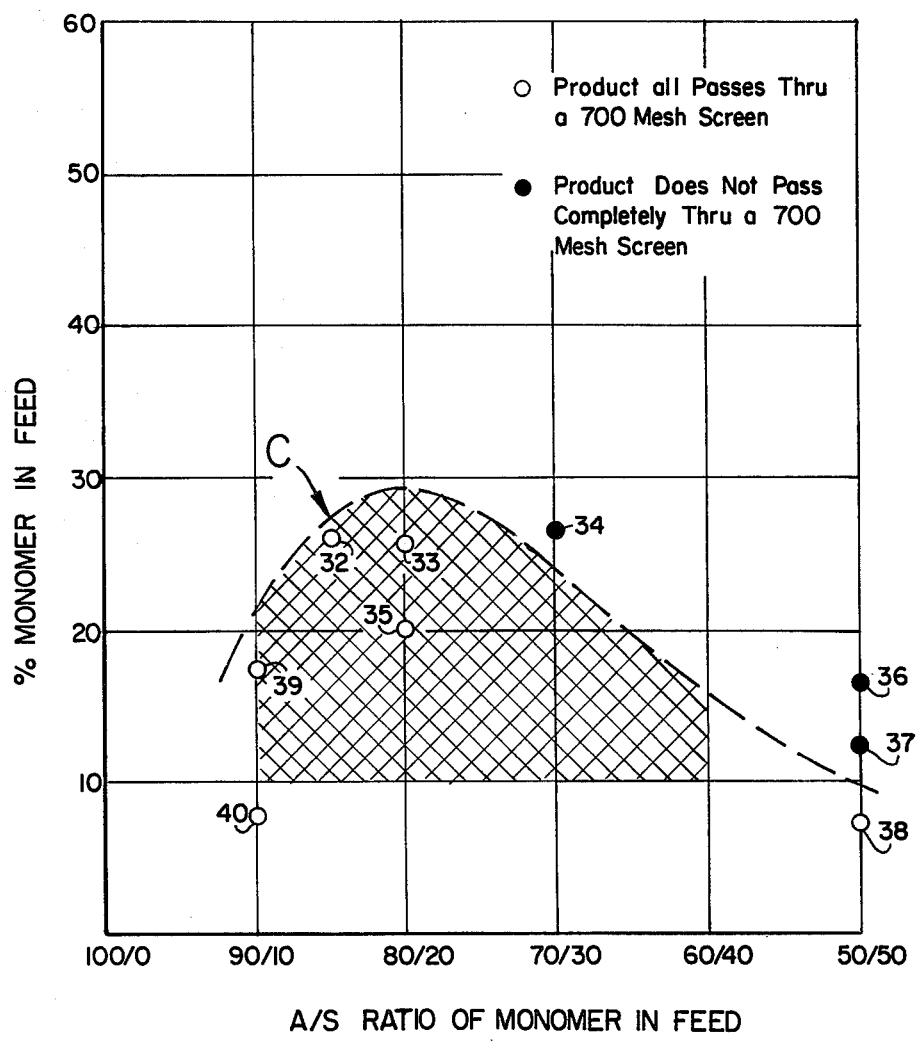
FIG. 9 is a plot of the wt-% of acrylonitrile-styrene mixture used to produce polymer/polyol compositions vs. the acrylonitrile to styrene weight ratio in the mixtures when the polyol ("Polyol VI" described below) has a molecular weight of 2000. The wt-% of the mixture is based on the sum of the weights of the mixtures and the polyol used to produce the compositions.
Figure 10:
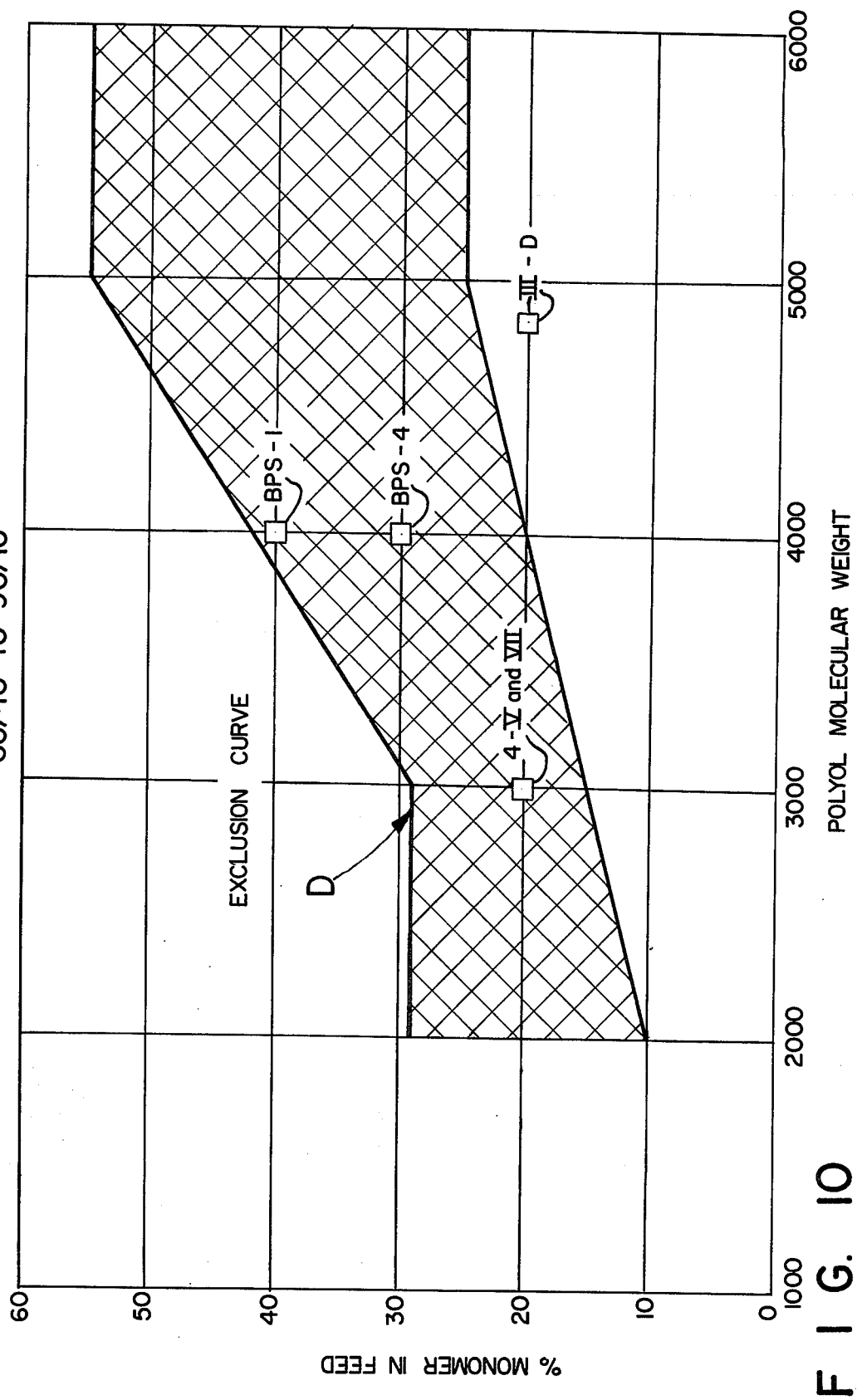
FIG. 10 is a plot of the wt-% of acrylonitrile-styrene mixtures used to produce polymer/polyol compositions vs. the molecular weights of the polyols when the polyol molecular weight is from 1500 to 6000. The wt-% of the mixture is based on the sum of the weights of the mixtures and the polyols used to produce the compositions.

In FIGS. 4, 8, 9, 10 and 11, shaded areas A, B, C, D and E represent compositions having A:S, polymer content and polyol molecular weight interrelationships which result in improved polymer polyol compositions in accordance with the present invention. FIG. 10 is a composite of the limits shown in FIGS. 4, 8 and 9.

Figure 4:
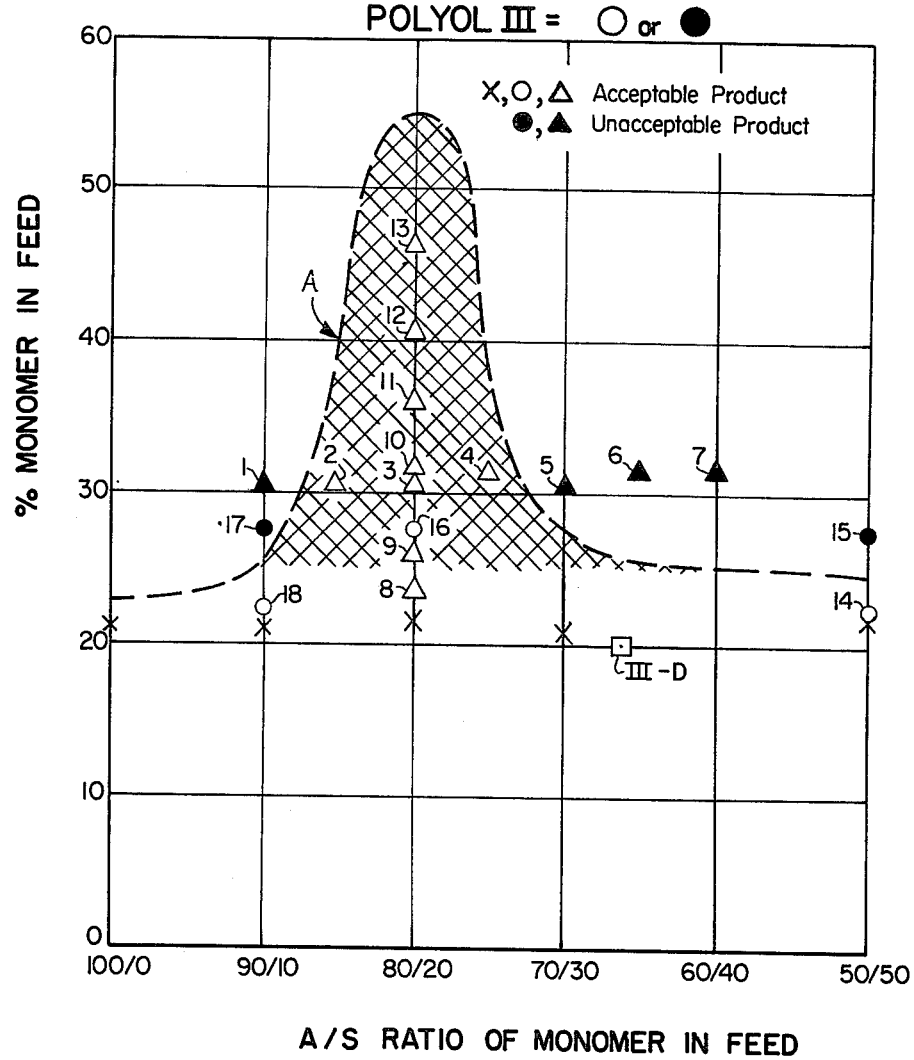
FIG. 4 is a plot of the wt-% of acrylonitrile-styrene mixture used to produce polymer/polyol compositions vs. the acrylonitrile to styrene weight ratio in the mixtures when the polyols ("Polyol I" and "Polyol III" described below) have molecular weights of 5000. The wt-% of the mixture is based on the sum of the weights of the mixtures and the polyols used to produce the compositions.
Figure 5:
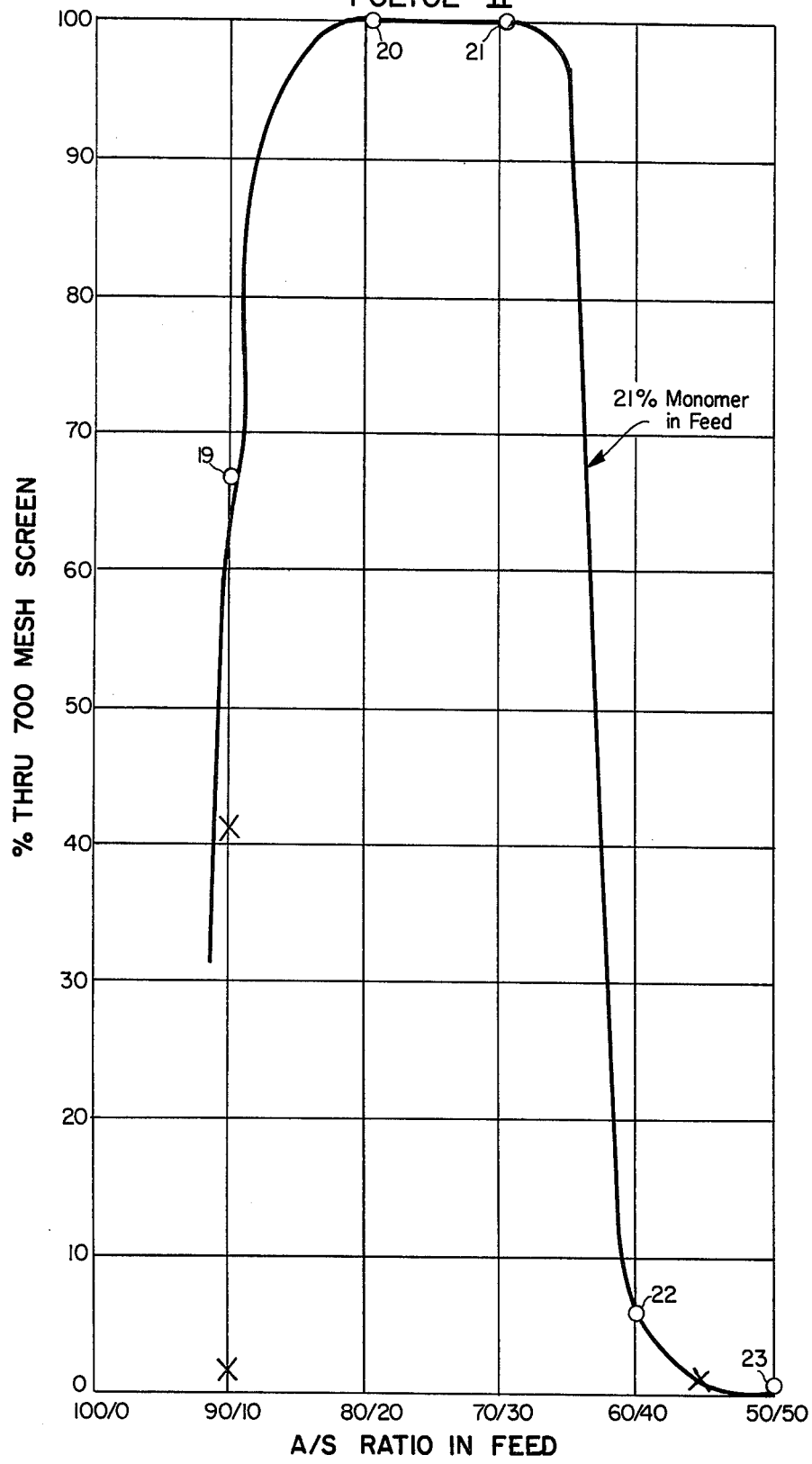
FIG. 5 is a plot of the wt-% of polymer/polyol compositions that pass through a 700 mesh screen vs. the acrylonitrile to styrene weight ratio in the acrylonitrile-styrene mixtures used to produce the compositions when the polyol ("Polyol II" described below) has a molecular weight of 3000.
Figure 6:
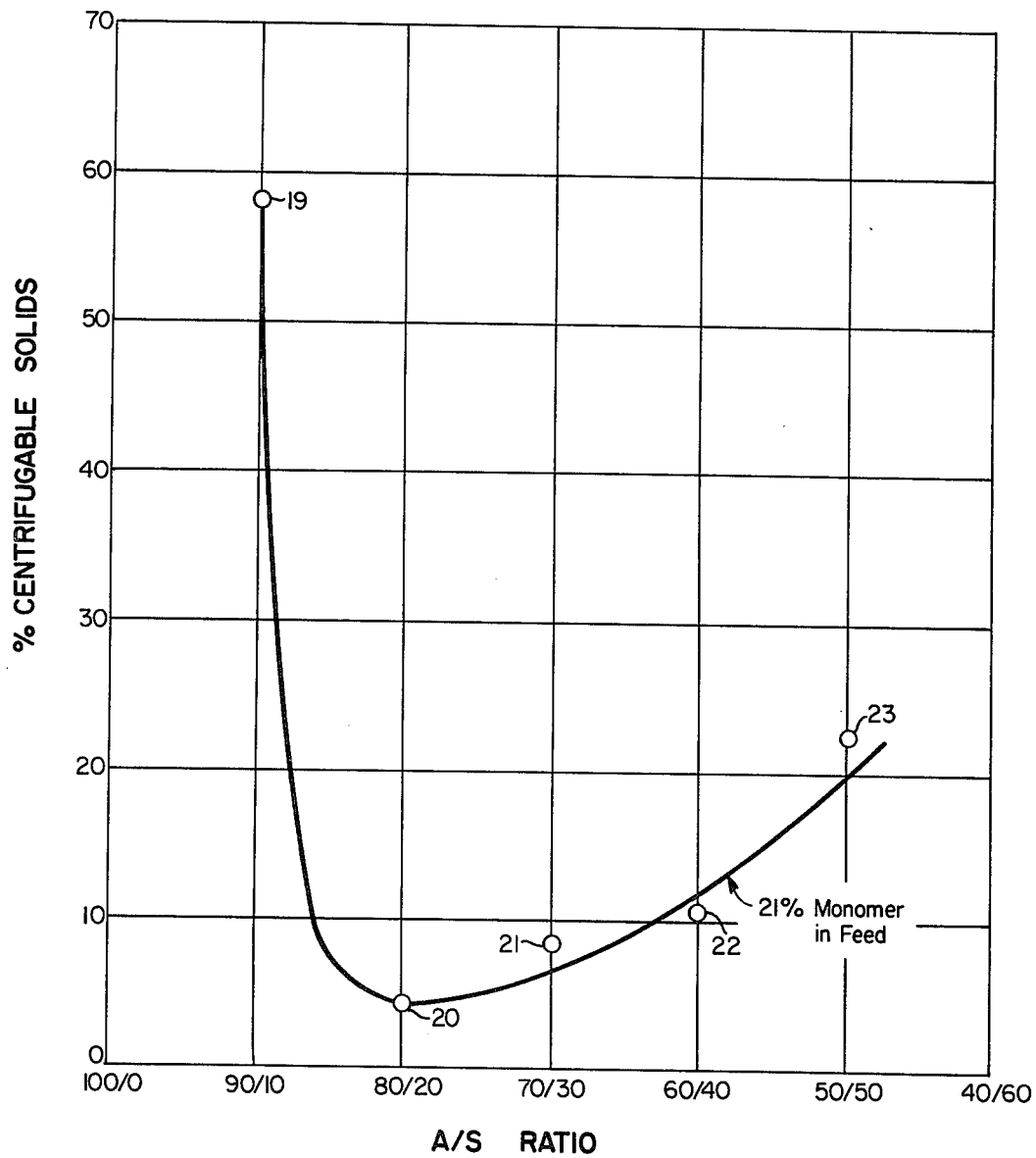
FIG. 6 is a plot of the wt-% of centrifugable solids in polymer/polyol compositions vs. the acrylonitrile to styrene weight ratio in the acrylonitrile-styrene mixtures used to produce the compositions when the polyol ("Polyol II" described below) has a molecular weight of 3000.

In FIGS. 4, 8 and 9, the areas below both the shaded area and the curve define compositions having satisfactory properties but no critical compositional interrelationships. The same is true for the area below the lower curve in FIGS. 10 and 11.

Figure 2:
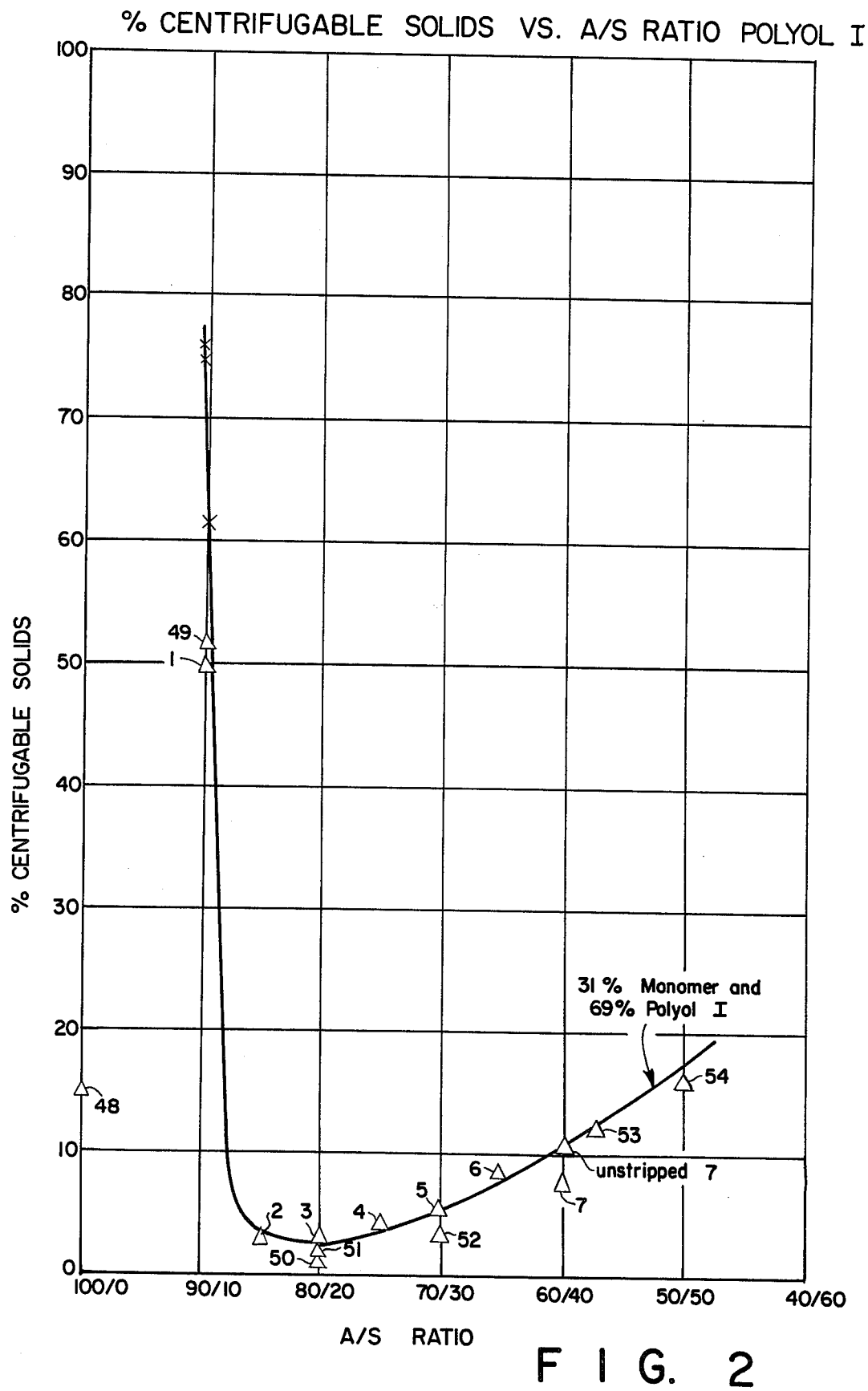
FIG. 2 is a plot of the wt.-% of centrifugable solids in polymer/polyol compositions vs. the acrylonitrile to styrene weight ratio in the acrylonitrile-styrene mixtures used to produce the compositions when the polyol ("Polyol I" described below) has a molecular weight of 5000.
Figure 3:
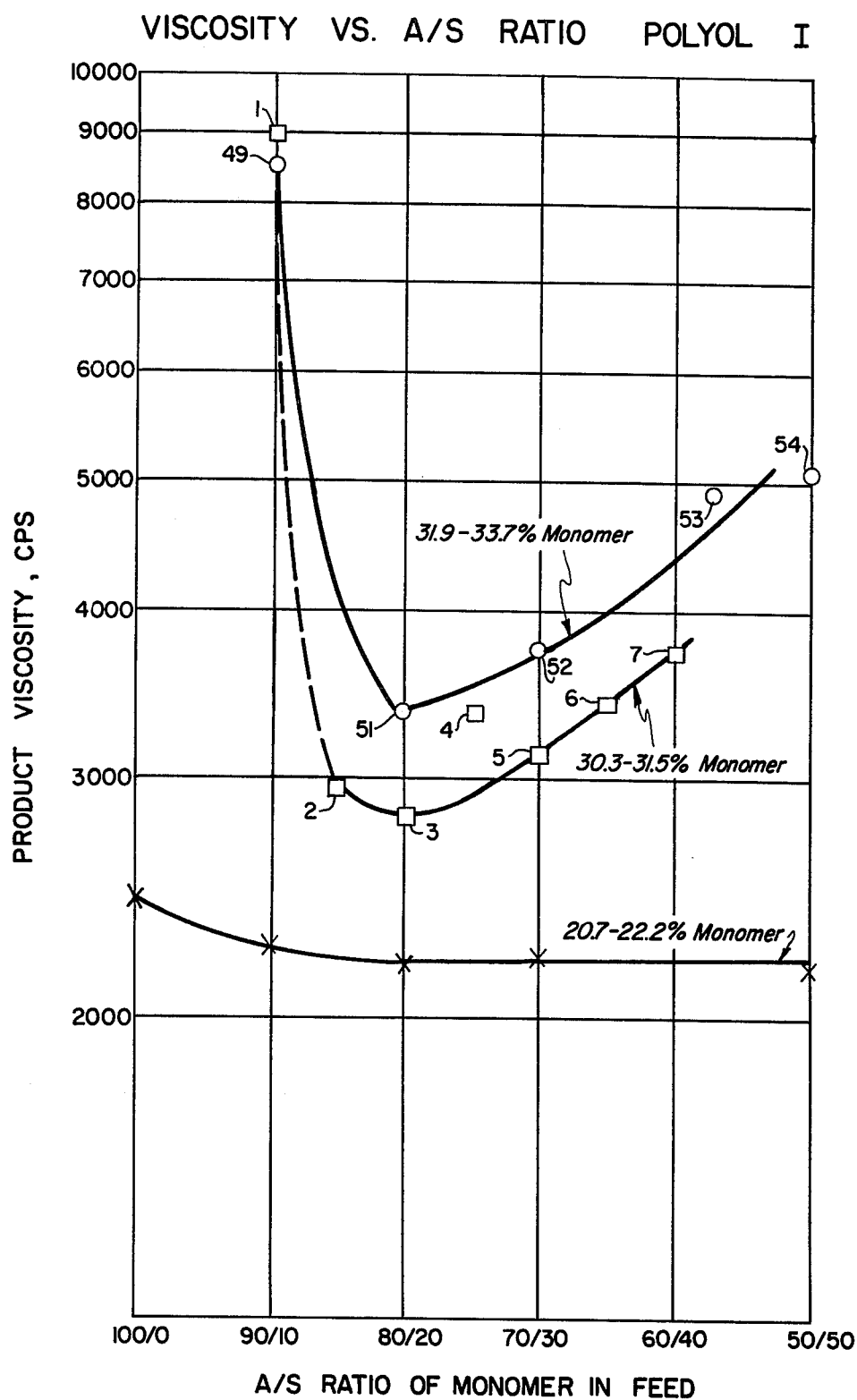
FIG. 3 is a plot of the viscosities (in centipoises at 25° C) of polymer/polyol compositions vs. the acrylonitrile to styrene weight ratio in the acrylonitrile-styrene mixtures used to produce the compositions when the polyol ("Polyol I" described below) has a molecular weight of 5000.

FIGS. 1 to 3 are plots of data from Examples 1 through 7 (summarized in Table A) and show the effect of varying the acrylonitrile to styrene (A:S) ratio between 90:10 and 60:40 at a monomer content in the feed of about 31 percent and with Polyol I (5000 molecular weight). There was sharp maximum in percent of product through 700-mesh screen at A:S ratios of 85:15, 80:20, and 75:25 as shown in FIG. 1. There was minimum in percent centrifugable solids as shown in FIG. 2 and a minimum in viscosity at 80:20 A:S ratio as shown in FIG. 3.

FIG. 4 is a plot of data from Examples 8 through 13 (summarized in Table B) and shows the effect of increasing the monomer content in the feed at an A:S ratio of 80:20 and with Polyol I. There was a complete passage of product (100%) through 700-mesh screen as the percent monomer in the feed was increased to 46% as shown in FIG. 4. There was a relatively small increase in centrifugable solids. Product viscosity increases with polymer content, but is minimized at a given polymer content by the use of an 80:20 A:S ratio.

FIG. 4 also has a plot of data from Examples 14 through 18 (summarized in Table C) where an all propylene oxide polyol (Polyol III) was used in contrast to the ethylene oxide capped polyol (Polyol I) used in Examples 1-13.

Figure 7:
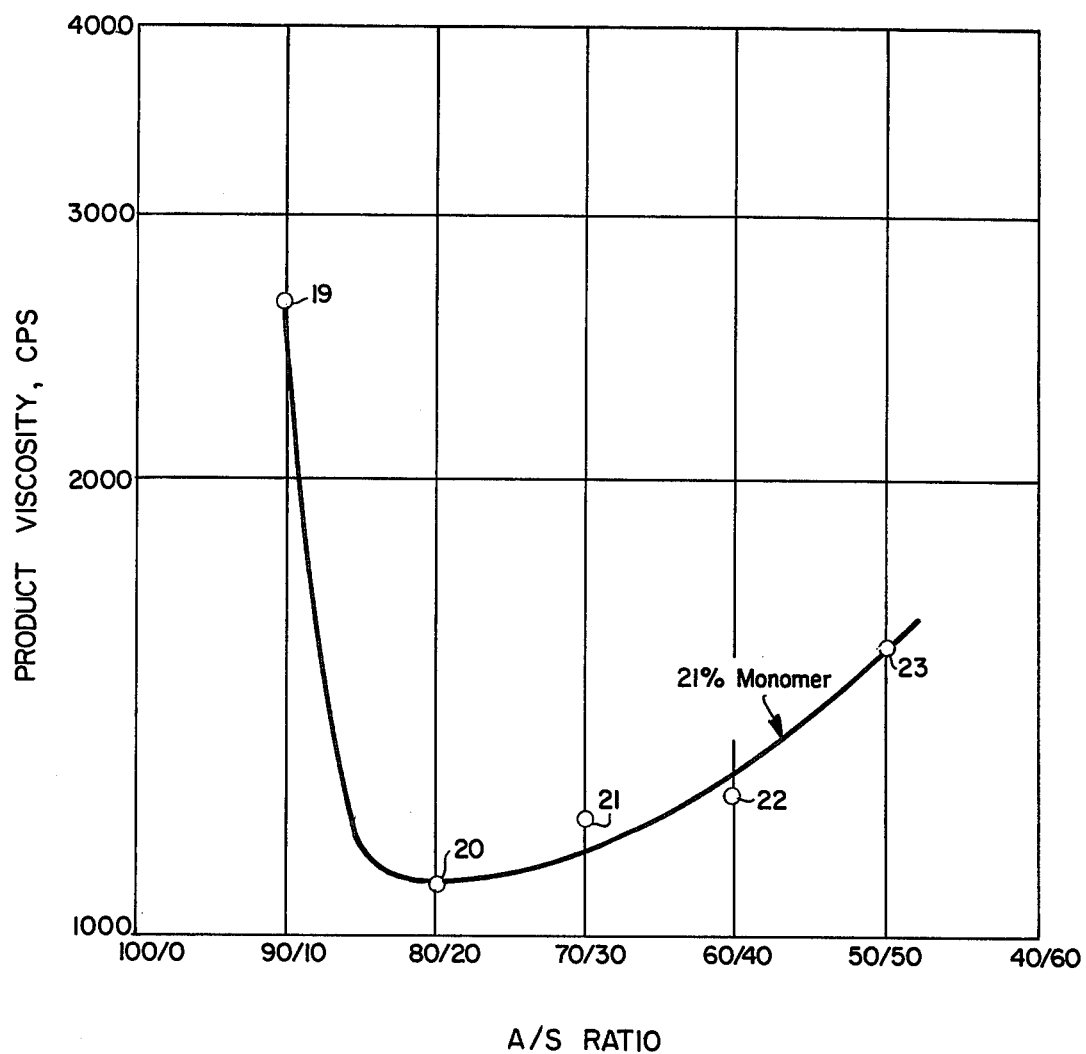
FIG. 7 is a plot of the viscosities (in centipoises at 25° C) of polymer/polyol compositions vs. the acrylonitrile to styrene weight ratio in the acrylonitrile-styrene mixtures used to produce the compositions where the polyol ("Polyol II" described below) has a molecular weight of 3000.

FIGS. 5 to 8 are plots of data from Examples 19 through 23 (summarized in Table D) and show the effect of varying the A:S ratio between 90:10 and 50:50 at a monomer content of about 21 percent with Polyol II which is an all propylene oxide polyol of about 3000 molecular weight. There was a maximum in percent through 700-mesh screen (FIG. 5) and minima in centrifugable solids (FIG. 6) and product viscosity (FIG. 7).

FIG. 8 is also a plot of data from Examples 24 through 27 (summarized in Table E) and helps define the limits of A:S ratio and polymer content for Polyol II.

FIG. 8 is also a plot of data from Examples 28-31 (summarized in Table F) and shows a 3000 molecular weight diol (Polyol VII) versus the 3000 molecular weight triol (Polyol II) used in Examples 19-27.

FIG. 9 is a plot of data from Examples 32-40 (summarized in Table G) which were made using a 2000 molecular weight diol (Polyol VI).

Examples 41 and 42 (summarized in Table H) show that the use of a 1000 molecular weight diol (Polyol V) does not result in the production of an improved polymer/polyol composition such as results from the use of a polyol having a molecular weight of at least 1500 as required in the present invention.

Examples 43–46 (summarized in Table H) show the use of a particularly high molecular weight polyol (Polyol IV).

Figure 11:
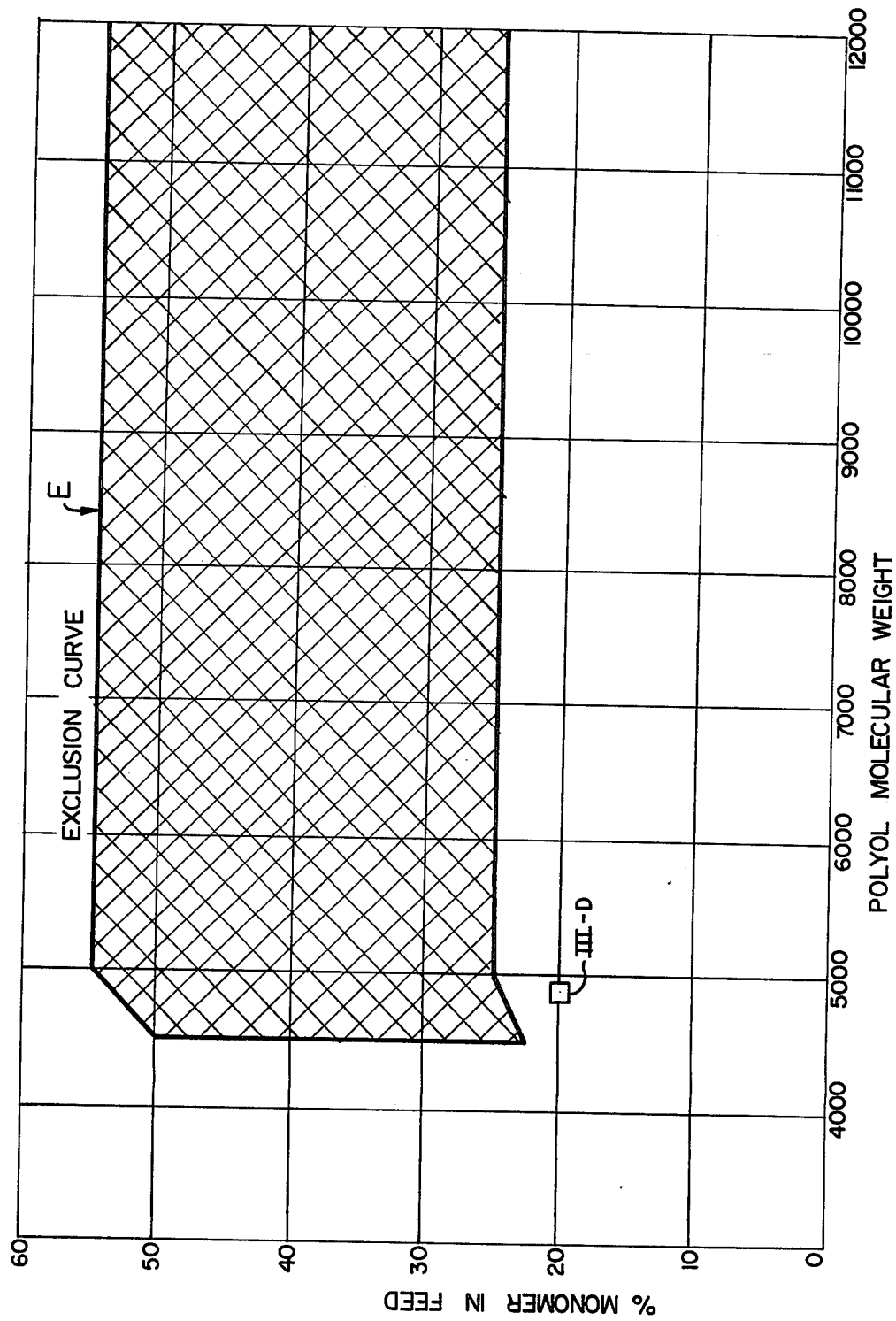
FIG. 11 is a plot of the wt-% of acrylonitrile-styrene mixtures used to produce polymer/polyol compositions vs. the molecular weights of the polyols when the polyol molecular weight is from 4500 to 12000. The wt-% of the mixture is based on the sum of the weights of the mixtures and the polyols used to produce the compositions.

FIGS. 10 and 11 define the percent monomer and polyol molecular weights that result in improved compositions of this invention. With reference to FIG. 10, the compositions of this invention produced from relatively low molecular weight polyols (e.g., polyols having molecular weights from 1500 to 2500) are relatively stable as compared to compositions produced from such polyols but employing A:S ratios outside the present invention. With reference to FIGS. 10 and 11, the compositions of this invention produced from relatively high molecular weight polyols (e.g., polyols having molecular weights of at least 4500 and preferably from 4500 to 12,000) have relatively less "scrap" and lower viscosities as compared to compositions produced from such polyols but employing A:S ratios outside the present invention. These latter improvements are particularly noticeable at A:S ratios of 80:20. Moreover, the novel compositions produced from such higher molecular weight polyols result in polyurethanes having improved elongation and resistance to tear.

EXAMPLES 55 to 72

Examples 55 to 72 were conducted to compare the properties of polyurethane elastomers produced from The polyurethane elastomers were produced from the following starting materials.

| Material | Amount |
|---|---|
| Polymer/polyol | 1.0 equivalent |
| Quasi-prepolymer[1] | 2.1 equivalent |
| Extender[2] | 1.0 equivalent |
| Stannous octoate | 0.05 part |

[1] The reactin product of sven moles of TDi and one mole of Polyol VIII having 30.7 wt-% free isocyanate groups.
[2] The reaction product of 2.4 moles of ethylene oxide and 1 mole of aniline having a hydroxyl number of 565.

The polymer/polyol, extender, and catalyst were charged to a 500 ml 4-necked flask equipped with a stirrer, thermometer, vacuum inlet and heating mantle. This mixture was degased (vacuum pump, about 1.0 mm Hg) for 30 minutes at 40°–45° C, the vacuum broken and the quasi-prepolymer added. Vacuum was reapplied an additional 30 seconds and the liquid mixture so produced was poured into heated (about 40° C) glass molds previously coated with "Hysol" mold release agent. The molds were then clamped and the elastomer cured in the oven for 16 hours at 100° C.

Physical properties of the polyurethane elastomers so produced are tabulated in Table K below. The properties of the compositions having 50:50 and 80:20 A:S ratios at a given polymer content are comparable. However, the former compositions are often difficult to produce and use due to large granule formation.

TABLE K

| Example | 55* | 45* | 57* | 58* | 59* | 60* | 651* | 62* | 63* | 64* | 65* | 66 | 67 | 68 | 69 | 70 | 71 | 72 |
|---|---|---|---|---|---|---|---|---|---|---|---|---|---|---|---|---|---|---|
| Polyacrylonitrile, wt. % | | | | | | | | | | | | | | | | | | |
| Based on urethane | 0.0 | 10.51 | 14.21 | 15.32 | 18.77 | 23.76 | — | — | — | — | — | — | — | — | — | — | — | — |
| Based on polymer/polyol | 0.0 | 12.8 | 17.2 | 18.35 | 22.4 | 28.0 | — | — | — | — | — | — | — | — | — | — | — | — |
| 50:50 A:S Polymer wt. % | | | | | | | | | | | | | | | | | | |
| Based on urethane | 0.0 | — | — | — | — | — | 11.57 | 15.29 | 20.42 | 25.96 | 28.46 | — | — | — | — | — | — | — |
| Based on polymer/polyol | 0.0 | — | — | — | — | — | 14.1 | 18.5 | 24.5 | 30.0 | 33.9 | — | — | — | — | — | — | — |
| 80/20 A:S Polymer wt. % | | | | | | | | | | | | | | | | | | |
| Based on urethane | 0.0 | — | — | — | — | — | — | — | — | — | — | 18.24 | 20.2 | 24.5 | 24.9 | 29.5[2] | 34.2[2] | 38.9[2] |
| Based on polymer/polyol | 0.0 | — | — | — | — | — | — | — | — | — | — | 21.7 | 24 | 28.8 | 29.8 | 34.6 | 39.6 | 44.7 |
| Physical Properties[1] | | | | | | | | | | | | | | | | | | |
| Hardness, Shore A | 50 | 68 | 73 | — | — | 83 | 62 | — | 67 | 71 | 77 | 68 | 66 | 74 | 75 | 81 | 79 | 87 |
| 100% Modulus, psi | 100 | 352 | 400 | 450 | 545 | 1075 | 353 | 378 | 526 | 745 | 1119 | 484 | 419 | 795 | 790 | 1340 | 1165 | 2800 |
| Tensile Strength, psi | 188 | 435 | 580 | 745 | 1455 | 1650 | 644 | 596 | 832 | 794 | 1711 | 685 | 542 | 795 | 1083 | 1116 | 969 | 266 |
| Elongation, % | 177 | 160 | 130 | 147 | 180 | 145 | 157 | 147 | 137 | 103 | 133 | 122 | 115 | 100 | 120 | 83 | 83 | 95 |
| Die "C" Tear, pli | — | — | — | — | — | — | 91 | 82 | 82 | 112 | 139 | 119 | 130 | 126 | 149 | 152 | 119 | 168 |

[1] ASTM D-3196-73 T for Exale 55 to 60 and ASTM D-412 for Examples 61 and 72
[2] 100% modulus extrapolated from Stress-Strain curve
*Comparative Example prior art polymer/polyol compositions (Examples 55 to 65) with the properties of polyurethane elastomers produced from polymer/polyol compositions of this invention (Examples 66 to 72). The polymer/polyols used in Example 55 to 65 had been produced from Polyol I and had the polymer composition shown in Table K. The polymer/polyol used in Examples 66 to 72 were produced as described above in Examples 8, 9, 3, 10, 11, 12 and 13 respectively.

What is claimed is:
1. A liquid polymer/polyol composition consisting essentially of: (1) from 45 to less than 80 wt.% of a polyoxypropylene polyol having a molecular weight of at least 2000 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dis- persed in the polyol, said composition being essentially free of polymer particles having diameters over 30 microns, said composition having been produced by polymerizing a monomer mixture of acrylonitrile and styrene in the polyol, said composition having (i) a wt.% of the monomer mixture, based on the sum of the weights of the monomer mixture and the polyol used to produce the composition, and (ii) a weight ratio of acrylonitrile to styrene in the monomer mixture such that a plot of (i) versus (ii) falls in area A of FIG. 4 when the polyol has a molecular weight of about 5,000, in area B of FIG. 8 when the polyol has a molecular weight of about 3,000 or in area C of FIG. 9 when the polyol has a molecular weight of about 2,000 and said composition being a composition other than: (A) a composition produced from 60 wt.% of a polyol having a molecular weight of about 4000 produced by the addition of 87 parts by weight of propylene oxide and 13 parts by weight of ethylene oxide to propylene glycol and 40 wt.% of a mixture of 80 wt.% acrylonitrile and 20 wt.% styrene; and (B) a composition produced from 70 wt.% of a polyol having a molecular weight of about 4,000 produced by the addition of 87 parts by weight of a propylene oxide and 13 parts by weight of ethylene oxide to propylene glycol and 30 wt.% of a mixture of 80 wt.% of acrylonitrile and 20 wt.% styrene.

2. A composition as claimed in claim 1 wherein the polyol has a molecular weight of about 3000 and wherein (i) the wt.-% of the monomer mixture, based on the sum of weights of the mixture and the polyol used to produce the composition, and (ii) the weight ratio of acrylonitrile to styrene in the monomer mixture are such that a plot of (i) versus (ii) would fall in area B of FIG. 8.

3. A composition as claimed in claim 1 wherein the composition consists essentially of from 45 to 75 wt.% of the polyol and from 55 to 25 wt.% of the polymer.

4. A liquid polymer/polyol composition consisting essentially of: (1) from 45 to less than 80 wt.% of a polyoxypropylene polyol having a molecular weight of about 5,000 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free polymer particles having diameters over 30 microns, said composition having been produced by polymerizing a monomer mixture of acrylonitrile and styrene in the polyol and said composition having (i) a wt.% of the monomer mixture, based on the sum of weights of the mixture and the polyol used to produce the composition, and (ii) a weight ratio of acrylonitrile to styrene in the monomer mixture are such that a plot of (i) versus (ii) would fall in area A of FIG. 4.

5. A liquid polymer/polyol composition consisting essentially of: (1) from 45 to less than 80 wt.% of a polyoxypropylene polyol having a molecular weight of about 2,000 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free of polymer particles having diameters over 30 microns, said composition having been produced by polymerizing a monomer mixture of acrylonitrile and styrene in the polyol and said composition having (i) a wt.% of the monomer mixture, based on the sum of weights of the mixture and the polyol used to produce the composition, and (ii) a weight ratio of acrylonitrile to styrene in the monomer mixture are such that a plot of (i) versus (ii) would fall in area C of FIG. 9.

6. A liquid polymer/polyol composition consisting essentially of: (1) from 45 to less than 80 wt.% of a polyoxypropylene polyol having a molecular weight from 2,000 to 2,500 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free of polymer particles having diameters over 30 microns and said composition having been produced by polymerizing a monomer mixture of acrylonitrile and styrene in the polyol, (ii) the wt.% of the monomer mixture, based on the sum of weights of the mixture and the polyol used to produce the composition and (ii) the molecular weight of a polyol being such that a plot of (i) versus (ii) would fall in area D of FIG. 10.

7. A liquid polymer/polyol composition consisting essentially of: (1) from 45 to less than 80 wt.% of a polyoxpropylene polyol having a molecular weight of at least 2000 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free of polymer particles having diameters over 30 microns, and said composition having been produced by polymerizing a monomer mixture of acrylonitrile and styrene in the polyol, (i) the wt.% of the monomer mixture, based on the sum of weights of the mixture and the polyol used to produce the composition and (ii) the molecular weight of a polyol being such that a plot of (i) versus (ii) would fall in area D of FIG. 10, except for points BPS-1 and BPS-4 in said area.

8. A liquid polymer/polyol composition consisting essentially of: (1) having from 45 to less than 80 wt.% of a polyoxypropylene polyol having a molecular weight of from 4,500 to 12,000 and (2) from 55 to over 20 wt.% of an acrylonitrile-styrene polymer consisting essentially of: (a) from 60 to 90 wt.% polymerized acrylonitrile and (b) from 40 to 10 wt.% polymerized styrene, said polymer being in the form of particles that are stably dispersed in the polyol, said composition being essentially free of polymer particles having diameters over 30 microns and said composition having been produced by polymerizing a monomer mixture of acrylonitrile and styrene in the polyol, (i) the wt.% of the monomer mixture, based on the sum of weights of the mixture and the polyol used to produce the composition, and (ii) the molecular weight of a polyol being such that a plot of (i) versus (ii) would fall in area E of FIG. 11.

9. A liquid polymer/polyol composition consisting essentially of: (1) from 45 to 75 wt.% of a polyoxypropylene polyol having a molecular weight of at least 2000 and (2) from 55 to 25 wt.% of an acrylonitrile-styrene polymer consisting essentially of (a) from 60 to 90 wt.% polymerized acrylonitrile and (b) from 40 to 10 wt.% polymerized styrene, said polymer being in the form of particles that are stably dispersed in the polyol, said composition being essentially free of polymer particles having diameters over 30 microns, and said composition having been produced by polymerizing a monomer mixture of acrylonitrile and styrene in the polyol, (i) the wt.% of the monomer mixture, based on the sum of weights of the mixture and the polyol used to produce the composition and (ii) the molecular weight of the polyol being such that a plot of (i) versus (ii) would fall in area D of FIG. 10, except for points BPS-1 and BPS-4 in said area.

10. An elastomeric polyurethane produced by reacting: (a) a polymer/polyol composition as claimed in claim 1 and (b) an organic polyisocyanate in the presence of (c) a catalyst for the reaction of (a) and (b) to produce the polyurethane.

* * * * *

UNITED STATES PATENT AND TRADEMARK OFFICE
CERTIFICATE OF CORRECTION

PATENT NO. : 4,104,236
DATED : August 1, 1978
INVENTOR(S) : Donald W. Simroth

It is certified that error appears in the above-identified patent and that said Letters Patent are hereby corrected as shown below:

First page, in the heading, delete the title and substitute --Liquid Polymer/Polyols and Elastomeric Polyurethanes Based Thereon--. Column 2, line 56, delete "2200" and substitute --2,000--, and line 62, delete "have" and substitute --having--. Column 3, line 28, delete "20" and substitute --30--, and line 33, delete "high" and substitute --higher--. Column 7, line 7, delete "illustrations" and substitute --illustration--; and line 8, delete "C," and substitute --C.--. Column 8, line 26, delete "poly(phenylene isocyanates)." and substitute --poly(phenyleneisocyanates).--. Column 13, Table F, the numbers to the right of "Monomer Content in Feed, Wt %" should be --25.9, 31.2, 36.5, 27.6--. Column 14, Table G, delete the column heading "37(a)*" and substitute --36(a)*--; and delete the column heading "49" and substitute --39--. Column 16, Table G, delete the column heading "37(a)*" and substitute --36(a)*--; and delete the column heading "49" and substitute --39--. Column 17, Table J, under "Example", on the 10th line, after "Light", delete "transmissin" and substitute --transmission--; on the 12th line, delete "60 m oo" and substitute --600 m$\mu$--; on the 14th line, before "value," delete "Sedimentaton" and substitute --Sedimentation--; and, in footnote (6), before "is clear," delete "Zeri" and substitute --Zero--. Column 19, Table K, delete the column heading "45*" and substitute --56*--; and delete the column heading "651*" and substitute --61*--; in the column headed "55," opposite "100% Modulus psi," delete "100" and substitute --180--; and, in footnote (1), "before" 55 to 60", delete "Exale" and substitute --Example--. Column 20, line 8, in footnote (1), delete "TDi" and substitute --TDI--. Column 21, line 47, after "free", insert --of--; and line 54, delete "are".

UNITED STATES PATENT OFFICE
CERTIFICATE OF CORRECTION

Patent No. 4,104,236                Dated  Aug. 1, 1978

Inventor(s)  Donald W. Simroth

It is certified that error appears in the above-identified patent and that said Letters Patent are hereby corrected as shown below:

In the drawings, Sheet 8, Fig.8, delete the shaded area below the horizontal line corresponding to 21% Monomer in Feed, so that the corrected figure is as shown below:

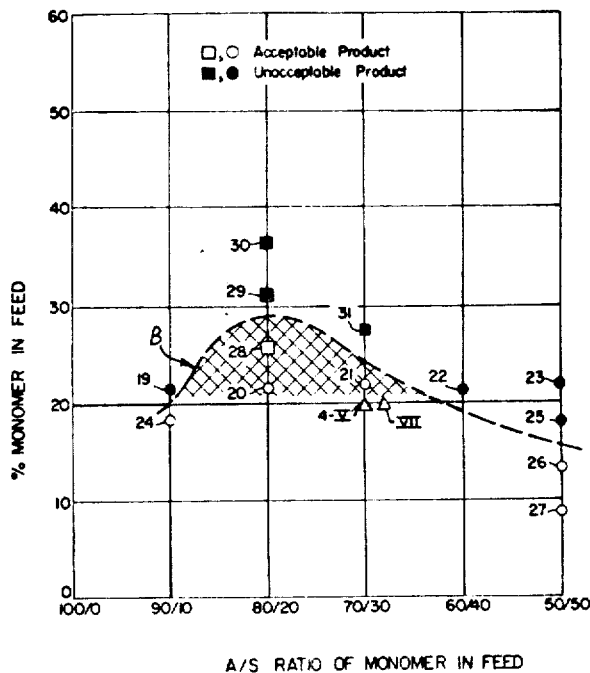

FIG. 8

UNITED STATES PATENT OFFICE
CERTIFICATE OF CORRECTION

Patent No. 4,104,236  Dated Aug. 1, 1978

Inventor(s) Donald W. Simroth

It is certified that error appears in the above-identified patent and that said Letters Patent are hereby corrected as shown below:

In the drawings, Sheet 9, Fig. 9, delete the shaded area below the horizontal line corresponding to 21% Monomer in Feed, so that the corrected figure is as shown below:

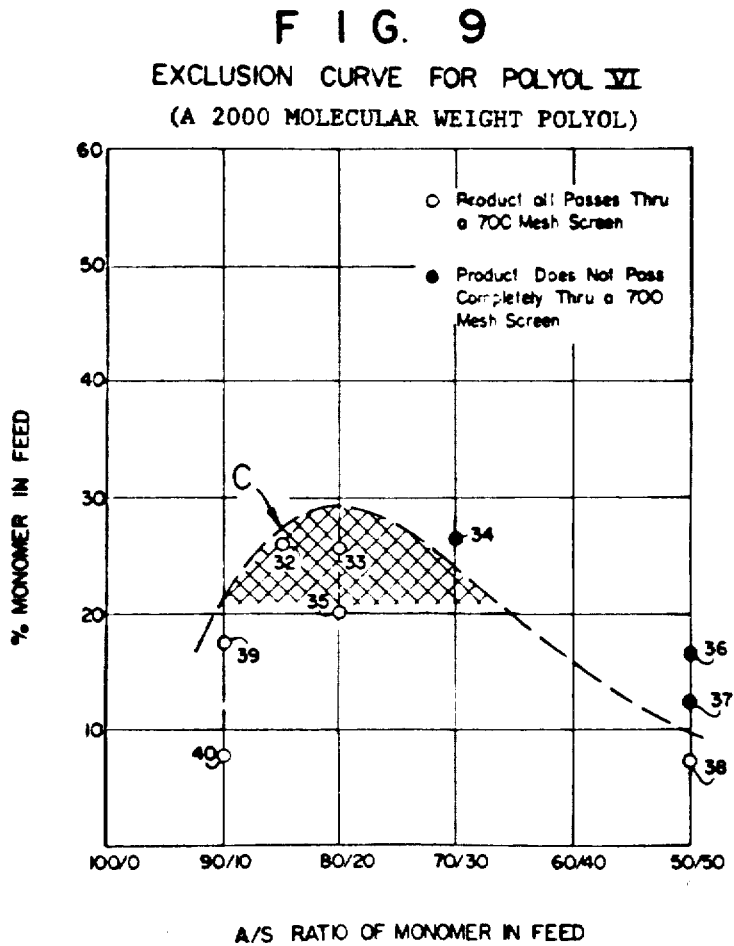

UNITED STATES PATENT OFFICE
CERTIFICATE OF CORRECTION

Patent No. 4,104,236    Dated  Aug. 1, 1978

Inventor(s)  Donald W. Simroth

It is certified that error appears in the above-identified patent and that said Letters Patent are hereby corrected as shown below:

In the drawings, Sheet 10, Fig. 10, delete the shaded area below the horizontal line corresponding to 21% Monomer in Feed, so that the corrected figure is as shown below:

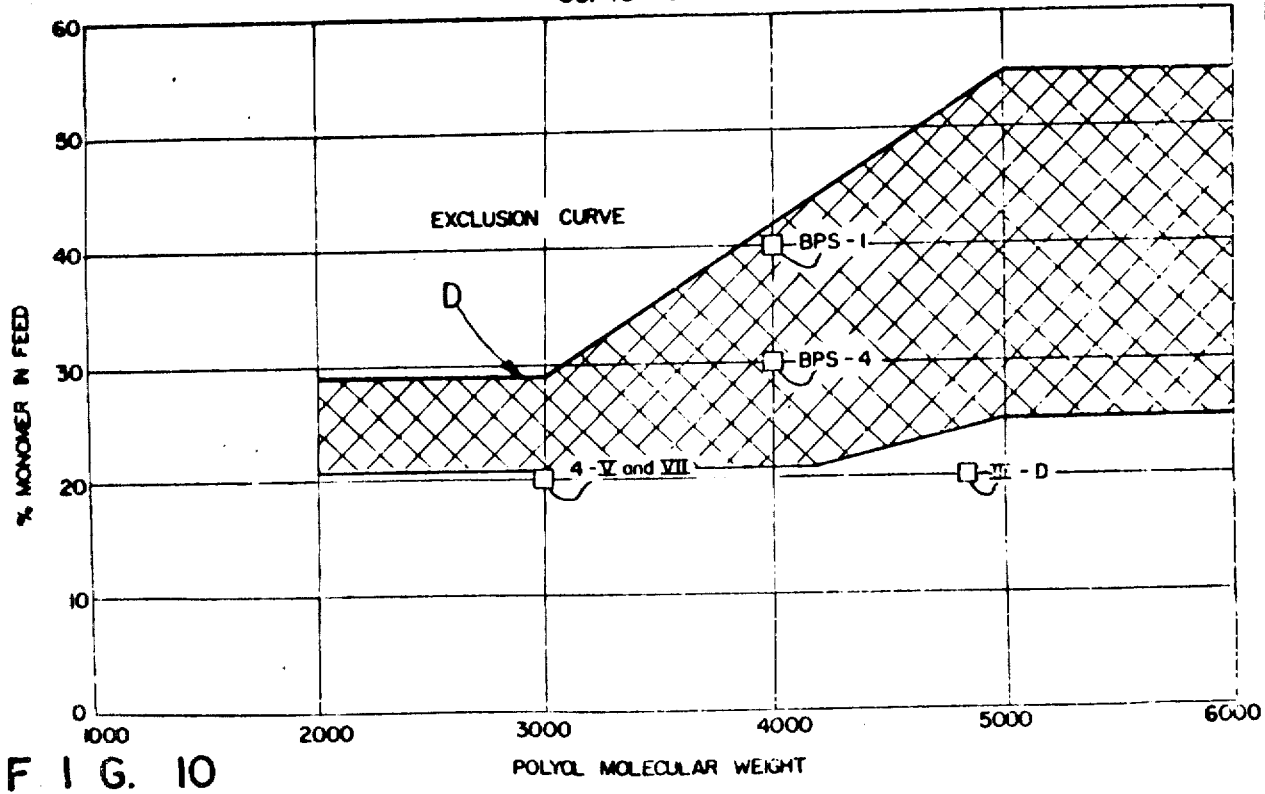

FIG. 10

UNITED STATES PATENT AND TRADEMARK OFFICE
CERTIFICATE OF CORRECTION

PATENT NO. : 4,104,236
DATED : August 1, 1978
INVENTOR(S) : Donald W. Simroth

It is certified that error appears in the above-identified patent and that said Letters Patent are hereby corrected as shown below:

Column 22, line 4, delete "are"; lines 21, 38 and 56, after each occurrence of "weight of" delete "a" and substitute -- the --; and line 42, delete "having".

Signed and Sealed this

Twenty-fourth Day of April 1979

[SEAL]

Attest:

RUTH C. MASON
Attesting Officer

DONALD W. BANNER
Commissioner of Patents and Trademarks